US007389329B2

(12) United States Patent
Naito et al.

(10) Patent No.: US 7,389,329 B2
(45) Date of Patent: Jun. 17, 2008

(54) METHOD OF MANAGING DOWNLOAD IN NETWORK SYSTEM

(75) Inventors: Yoshiko Naito, Kanagawa (JP); Tsuneaki Kurumida, Kanagawa (JP); Tetsuo Sakai, Kanagawa (JP); Hideo Ikeno, Kanagawa (JP); Jun Horiyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 743 days.

(21) Appl. No.: 09/793,635

(22) Filed: Feb. 27, 2001

(65) Prior Publication Data

US 2001/0054088 A1 Dec. 20, 2001

(30) Foreign Application Priority Data

Feb. 28, 2000 (JP) ............................. 2000-052326

(51) Int. Cl.
G06F 15/16 (2006.01)
(52) U.S. Cl. .................................................... 709/219
(58) Field of Classification Search ........ 709/201–203, 709/213–216, 217–219, 220–246, 207; 395/200; 700/19
See application file for complete search history.

(56) References Cited

U.S. PATENT DOCUMENTS

| 5,530,862 A | * | 6/1996 | Wadsworth et al. ............ 713/1 |
| 5,537,550 A | * | 7/1996 | Russell et al. ............... 709/224 |
| 5,537,626 A | * | 7/1996 | Kraslavsky et al. ............ 710/8 |
| 5,550,997 A | * | 8/1996 | Ip et al. ....................... 711/103 |
| 5,568,612 A | * | 10/1996 | Barrett et al. ............... 709/203 |
| 5,613,160 A | * | 3/1997 | Kraslavsky et al. .......... 710/16 |
| 5,623,604 A | * | 4/1997 | Russell et al. ............... 717/167 |
| 5,647,056 A | * | 7/1997 | Barrett et al. ............... 709/220 |

(Continued)

OTHER PUBLICATIONS

ACM SIGDOC Asterisk Journal of Computer Documentation:☐☐☐☐Using problem analysis to support decisions and planning in complex processes , Chris Hallagen, Feb. 1997.*

Primary Examiner—Jason Cardone
Assistant Examiner—Thomas Duong
(74) Attorney, Agent, or Firm—Fitzpatrick, Cella, Harper & Scinto

(57) ABSTRACT

The invention manages the download of print resource data, which is used during print processing, to a plurality of printing apparatuses in a network system in which the plurality of printing apparatuses and a server are connected. An identifier for g the print resource data to be downloaded is input, and downloadable printing apparatuses are determined in accordance with a type of a storage device attached to each of the plurality of printing apparatuses. The print resource data corresponding to the input identifier is downloaded to the determined printing apparatuses. When the data processing apparatus holds the print resource data corresponding to the identifier, the held print resource data is downloaded, and when the data processing apparatus does not hold the print resource data corresponding to the identifier, the print resource data is acquired from the server and downloaded. A server flag set to the downloaded print resource data is read, and it is determined that the downloaded print resource data should be transferred to the server when the server flag indicates that the downloaded print resource data should be transferred to said server, and it is determined determining that the downloaded print resource data should not be transferred to said server when the server flag indicates that the downloaded print resource data should not be transferred to said server.

18 Claims, 39 Drawing Sheets

U.S. PATENT DOCUMENTS

| | | | | |
|---|---|---|---|---|
| 5,657,448 | A * | 8/1997 | Wadsworth et al. | 709/220 |
| 5,696,899 | A * | 12/1997 | Kalwitz | 709/228 |
| 5,784,622 | A * | 7/1998 | Kalwitz et al. | 710/200 |
| 5,815,722 | A * | 9/1998 | Kalwitz et al. | 717/178 |
| 5,841,991 | A * | 11/1998 | Russell | 709/221 |
| 6,003,065 | A * | 12/1999 | Yan et al. | 709/201 |
| 6,085,180 | A * | 7/2000 | Beer et al. | 705/401 |
| 6,289,382 | B1 * | 9/2001 | Bowman-Amuah | 709/226 |
| 6,292,827 | B1 * | 9/2001 | Raz | 709/217 |
| 6,421,733 | B1 * | 7/2002 | Tso et al. | 709/246 |
| 6,556,875 | B1 * | 4/2003 | Nagasaka et al. | 700/19 |
| 6,606,744 | B1 * | 8/2003 | Mikurak | 717/174 |
| 6,829,707 | B1 * | 12/2004 | Marshall et al. | 713/150 |
| 6,925,606 | B2 * | 8/2005 | Shaw et al. | 715/749 |
| 6,992,785 | B1 * | 1/2006 | Chatcavage et al. | 358/1.15 |
| 2003/0043395 | A1 * | 3/2003 | Takahashi | 358/1.13 |
| 2003/0141987 | A1 * | 7/2003 | Hayes | 340/825.72 |

* cited by examiner

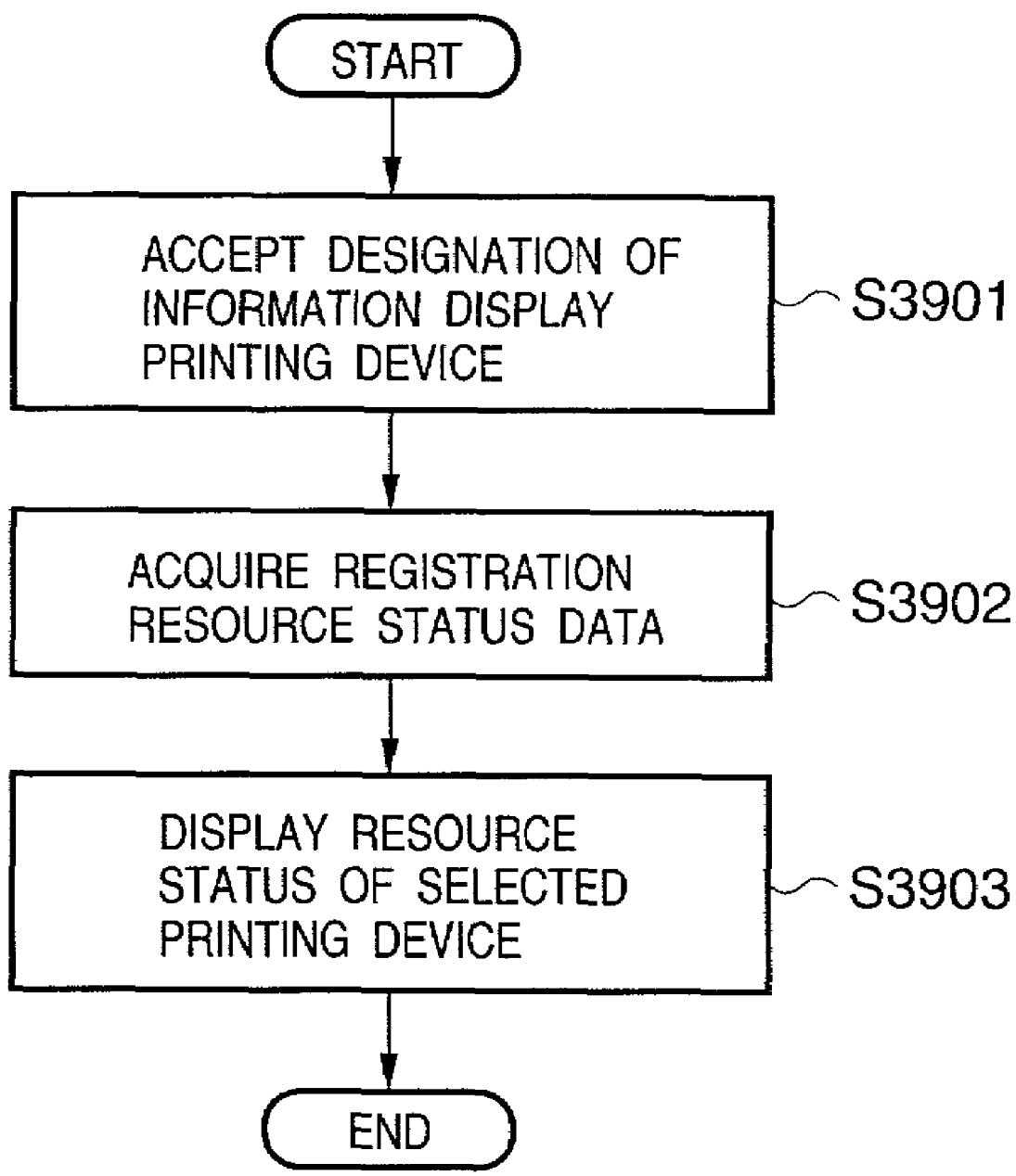

METHOD OF MANAGING DOWNLOAD IN NETWORK SYSTEM

FIELD OF THE INVENTION

The present invention relates to a network system and, more particularly, to management of a network system in which software or the like is downloaded to an electronic apparatus such as a printer, copying machine, or computer.

BACKGROUND OF THE INVENTION

When software or a resource such as a font or form is downloaded to an electronic apparatus such as a printer connected to a network, the downloaded information is managed by a computer which has downloaded the information.

If, however, a single computer downloads information and manages the downloaded information, the load on this computer increases in a network environment in which a large number of electronic apparatuses are connected. Also, if the network contains a plurality of computers capable of download, information may be confused.

It is, therefore, an object of the present invention to provide a network system, download apparatus, server, and network management method capable of reducing the load on data downloaded in a network system and reducing the load on the management of the download, and also capable of appropriately managing these pieces of information.

SUMMARY OF THE INVENTION

According to the present invention, there is provided a network system comprising a plurality of electronic devices, one or a plurality of download apparatuses for downloading data to the electronic devices, and a server, wherein the server holds the data downloaded by the download apparatus and information concerning the download.

In this system, the server holds the downloaded data and the information concerning the download. Therefore, the download apparatus need not hold these data and information, and this reduces the load on the download apparatus. Also, since the downloaded data and the information concerning the download are held by the server, they are managed in a so-called unitary manner and hence can be appropriately managed.

According to the present invention, there is provided a download apparatus for downloading data to a plurality of electronic devices via a network system having the plurality of electronic devices and a server, characterized by comprising means for transferring the downloaded data and information concerning the download to the server.

According to the present invention, there is provided a server for managing download in a network system having a plurality of electronic devices and one or a plurality of download apparatuses for downloading data to the electronic devices, characterized by comprising means for unitarily holding the downloaded data and information concerning the download.

According to the present invention, there is provided a network system management method of managing download of data to a plurality of electronic devices in a network system in which the electronic devices and a server are connected, characterized by comprising the step of transferring the downloaded data and information concerning the download to the server.

According to the present invention, there is provided a recording medium recording a program which, in order to manage download of data to a plurality of electronic devices in a network system having the electronic devices and a server, allows a computer to function as means for transferring the downloaded data and information concerning the download to the server.

According to the present invention, there is provided a recording medium recording a program which, in order to manage download of data to a plurality of electronic devices in a network system having the electronic devices and a server, allows a computer to function as means for unitarily holding the downloaded data and information concerning the download.

According to the present invention, there is provided an information processing apparatus connected to a server apparatus for managing to download data to a plurality of electronic devices comprising first display control means for obtaining information concerning said electronic devices from said server apparatus and display a list of them on a display unit, and second display control means for obtaining information concerning-data which can be downloaded to the electric device designated from said electric devices and display them on the display unit, wherein data designated from said data which can be downloaded and are displayed by said second display control means are download to said designated electric device.

According to the present invention, there is provided a data management method executed on a system including a server apparatus for managing to download data to a plurality of electronic devices and client apparatuses connected to said server apparatus comprising first display step of obtaining information concerning said electronic devices from said server apparatus and display a list of them on a display unit, and second display step of obtaining information concerning data which can be downloaded to the electric device designated from said electric devices and display them on the display unit, wherein data designated from said data which can be downloaded and are displayed in said second display step are download to said designated electric device.

According to the present invention, there is provided a data download program executed on a computer connected to a server apparatus for managing to download data to a plurality of electronic devices comprising code for first display step of obtaining information concerning said electronic devices from said server apparatus and display a list of them on a display unit, and code for second display step of obtaining information concerning data which can be downloaded to the electric device designated-from said electric devices and display them on the display unit, wherein data designated from said data which can be downloaded and are displayed in said second display step are download to said designated electric device.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 39 is a flow chart showing processing by which the server 2 displays information of a printing device.

DETAILED DESCRIPTION OF THE PREFERRED EMBODIMENT

Figure 1:
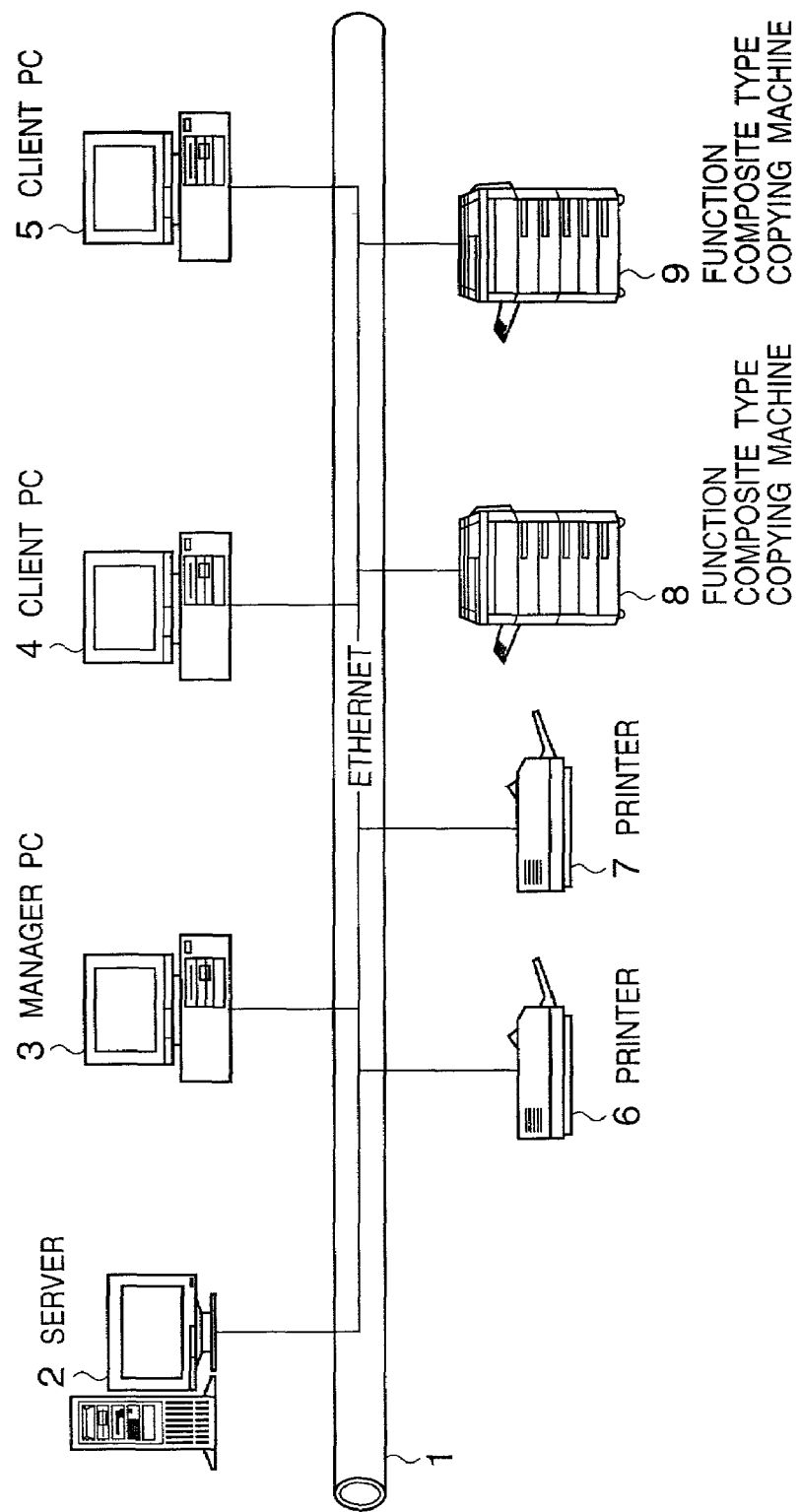
FIG. 1 is a view showing a system according to an embodiment of the present invention.

FIG. 1 is a view showing a system according to an embodiment of the present invention.

In FIG. 1, reference numeral 1 denotes a network, and Ethernet is used as this network 1. However, LocalTalk or the like can also be used. In this embodiment, "network" means one or a plurality of means (protocols) which implement information exchange by the combination of electrical signals, by using physical cables and the electrical signals propagating on these cables. Usually, "network" is a general term of these means.

A server 2 has various functions such as a file server function and Web server function.

A manager personal computer (a personal computer will be simply referred to as a PC hereinafter) 3 gives designations to the server and peripheral devices.

Client PCs 4 and 5 are PCs connected to the network 1, which are used by general users. Note that the manager PC can also be used as a client PC.

Printers 6 and 7 are connected to the network 1 to receive printing instructions from the client PCs 4 and 5 and perform printing in accordance with the instructions.

Function composite type copying machines 8 and 9 can be used as a copying machine, printer, scanner, and facsimile apparatus by using one or the combination of a plurality of functions, e.g., a copying function, image scanner function, printer function, and facsimile function.

The operation of this system will be described below.

The server 2 periodically communicates with the printers 6 and 7 and the function composite type copying machines 8 and 9, and monitors the statuses of these devices and the settings of their software. The manager PC 3 changes the settings of these devices and changes their software or resources used by the software.

Pieces of designation information from the manager PC 3 are collected by the server 2, and the client PCs 4 and 5 receive the information from the server 2.

The server 2 has a communication function using http. The manager PC 3 and the client PCs 4 and 5 can acquire information of the server 2 by using a Web browser and can give designations to the server 2.

When receiving designation from the manager PC 3 or the client PC 4 or 5, the server 2 returns information which the server 2 has to the manager PC 3 or the client PC 4 or 5. Depending on the contents of the information, the server 2 acquires information from the printer 6 or 7 or the function composite type copying machine 8 or 9 and returns the information to the manager PC 3 or the client PC 4 or 5. Alternatively, the server 2 performs setting of the printers 6 and 7 and the function composite type copying machines 8 and 9.

The manager PC 3 has a downloader and can download software or resources used by the software to the printers 6 and 7 and the function composite type copying machines 8 and 9. Examples of the software are printing control firmware and network control firmware of these devices. In addition to these kinds of firmware, the function composite type copying machines 8 and 9 have, e.g., scanner control firmware, facsimile control firmware, copying machine firmware, panel operation firmware, image management software, and address management software.

Examples of the resources used by the software are fonts, EUDC (End User Defined Characters), overlay forms, calibration tables, address information used by the address management software, and facsimile numbers.

The client PCs 4 and 5 hold software (e.g., drivers) for accessing and using the printers 6 and 7 and the function composite type copying machines 8 and 9, and also hold resources (client PC resources) used by the software.

Examples of the software of the client PCs 4 and 5 are a printer driver for using a printer, a scanner driver for using a scanner, a facsimile driver for using a facsimile apparatus, copying machine utility software for controlling a copying machine, a network driver for using a network, a Web browser, and application software. Examples of the resources used by the software are client PC fonts corresponding to printer fonts, address information used by the facsimile driver, printing data used when color calibration is performed, and overlay images used in preview.

In this system, the set contents, software, and resources used by the software of the printer 6 can be reflected on the other devices, i.e., the printer 7 and the function composite type copying machines 8 and 9. Analogously, the set contents, software, and resources used by the software of the function composite type copying machine 8 can be reflected on the function composite type copying machine 9 and the printers 6 and 7.

If these device types have functional differences, only functions common to these device types are reflected. However, information of a convertible resource can be reflected after conversion. Furthermore, information concerning these device types on the client PC 4 can be reflected on the client PC 5. These processes are implemented by exchanging information via the server 2.

The set contents of the printers 6 and 7 and the function composite type copying machines 8 and 9 can be changed not only by designations from the manager PC 3 but also by designations from operation panels of these devices and from the client PC 4 or 5. If change information must be accurately transferred to the client PC 4 or 5, the printers 6 and 7 and the function composite type copying machines 8 and 9 are constantly inquired when the client PC 4 or 5 gives display designation or the like, and information at the inquiry timing can be returned to the client PC. If no strict accuracy is necessary, information held in the server 2 can be used.

Figure 2:
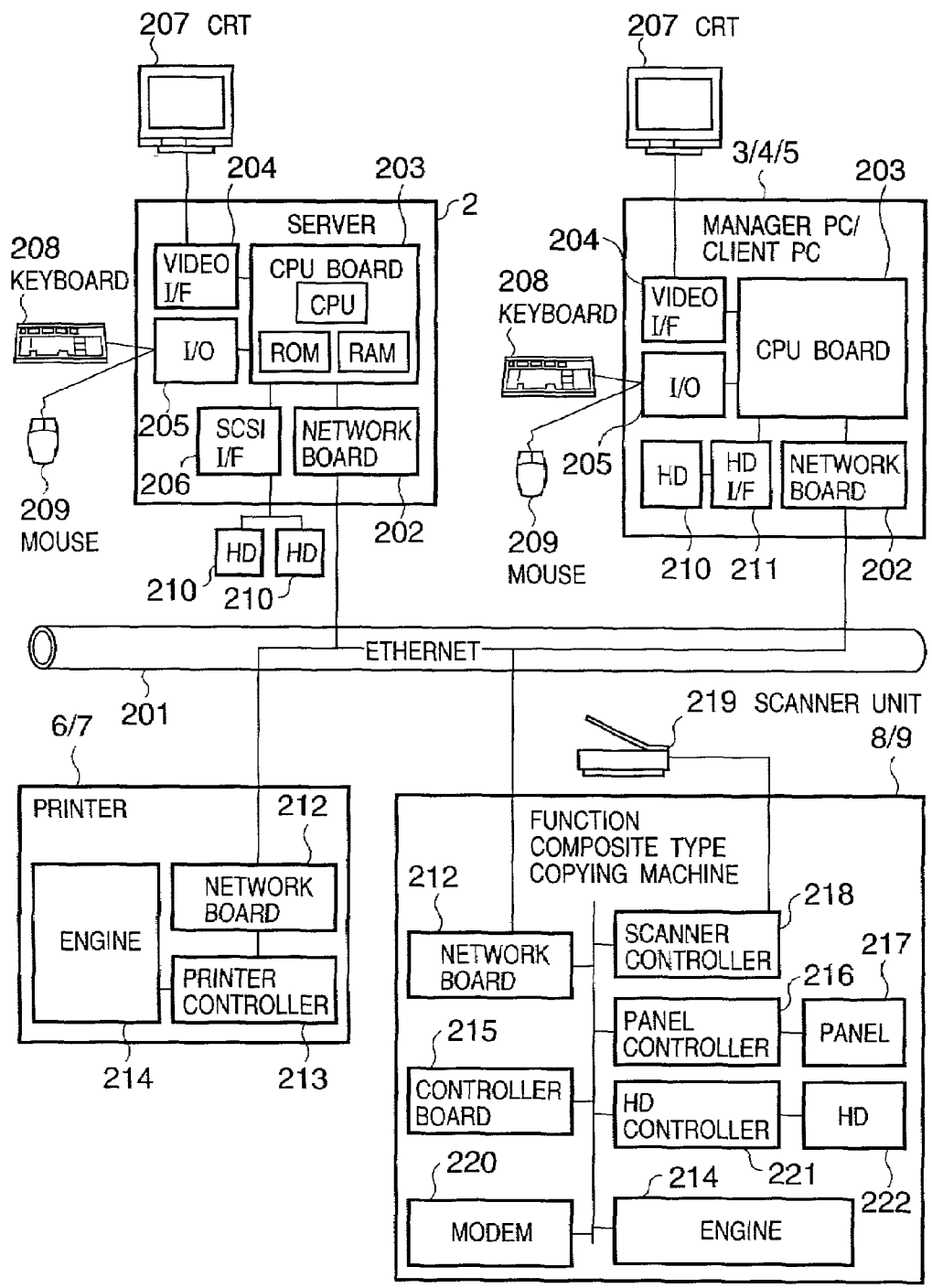
FIG. 2 is a view showing principal hardware modules of individual devices shown in FIG. 1.

FIG. 2 is a view showing main hardware modules of the individual devices shown in FIG. 1.

In FIG. 2, reference numeral 201 denotes a network line. This network line 201 is a physical line constructing a network between the devices. For example, a twisted pair cable, coaxial cable, or optical fiber can be used.

The server 2 includes a network board 202, CPU board 203, video interface 204, I/O interface 205, and SCSI interface 206, and also includes a CRT 207, keyboard 208, mouse 209, and hard disk drive 210 connected to these boards and interfaces.

In the hard disk drive 210, a plurality of hard disk units are connected in parallel. This ensures high data transfer speed and high reliability.

The manager PC3 and the client PCs 4 and 5 include a network board 202, CPU board 203, video interface 204, I/O interface 205, and IDE interface 211, and also includes a CRT 207, keyboard 208, mouse 209, and hard disk drive 210 connected to these boards and interfaces. The structure of the hard disk driver 210 differs from that of the server 2.

The printers 6 and 7 include a network board 212 corresponding to the peripheral devices, a printer controller 213, and a print engine 214.

The hardware modules of the function composite type copying machines 8 and 9 include a network board 212 corresponding to the peripheral devices, a function composite type copying machine controller 215, a print engine 214, an operation panel controller 216, an operation panel 217, a scanner controller 218, a scanner unit 219, a modem 220, a hard disk IF 221, and a hard disk 222.

Figure 3:
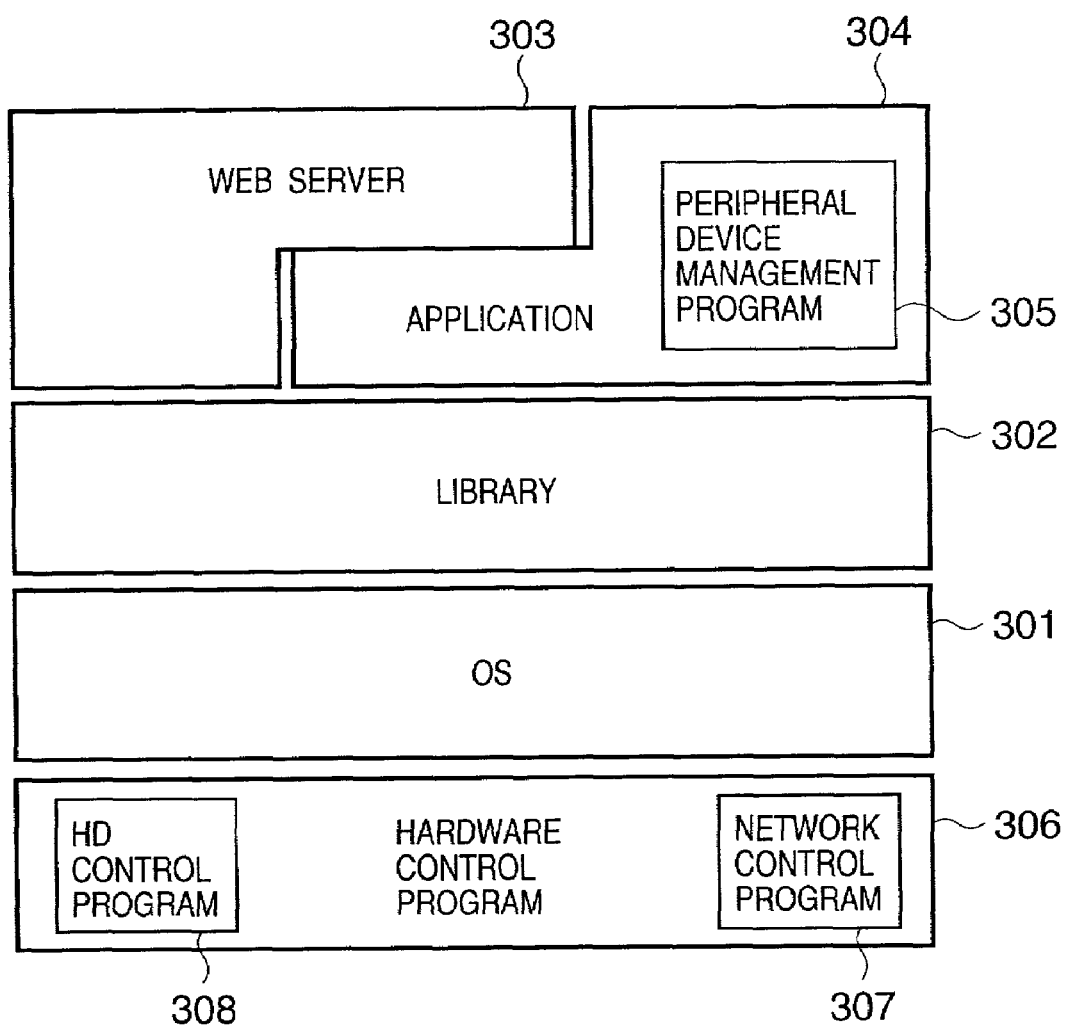
FIG. 3 is a view showing the software configuration of a server 2.

FIG. 3 is a view showing the software configuration of the server 2. In FIG. 3, reference numeral 301 denotes an OS (Operating System); 302, a library; 303, a Web server; and 304, an application which includes a peripheral device management program 305.

Reference numeral 306 denotes a hardware control program which includes a network board control program 307 and a hard disk control program 308.

Figure 4:
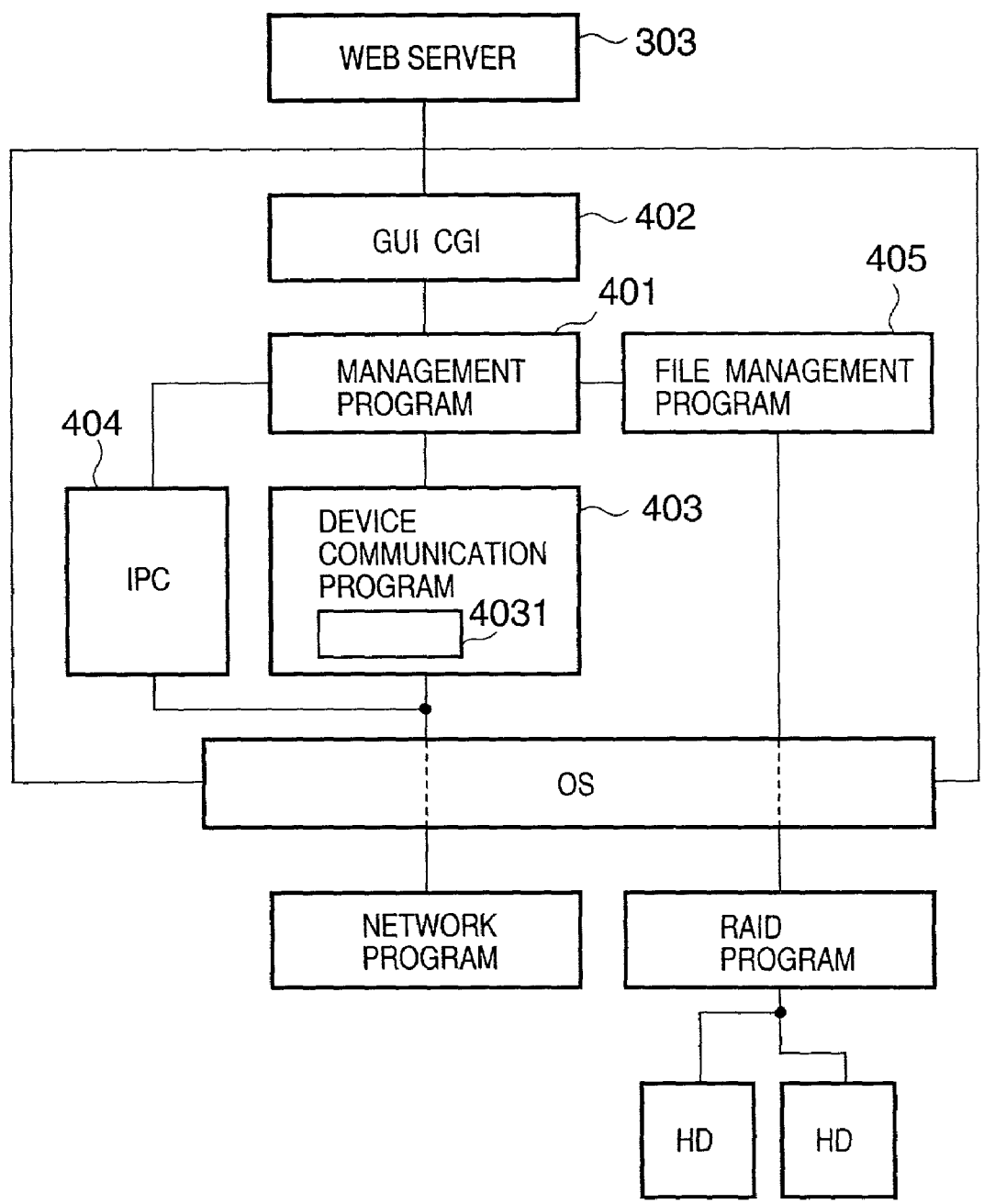
FIG. 4 is a view showing the configuration of a peripheral device management program 305.

FIG. 4 is a view showing the configuration of the peripheral device management program 305.

This peripheral device management program 305 is implemented as one application on the server 2.

Reference-numeral 401 denotes a main portion of this management program, which controls the entire management program. A GUI CGI program 402 transfers data of a frame expressed in an html format to the Web server 303. The Web server 303 sends, in an http format, the data from the CGI 402 to the manager PC 3 or the client PCs 4 and 5, and transfers designations from the manager PC 3 or the client PCs 4 and 5 to the management program 401.

A device communication program 403 performs communications between the peripheral devices and the server by using the network program 307 to acquire information and the like from a device, set a device, and download software and resources used by the software. This device communication program 403 also includes a peripheral device information acquisition module 4031.

An IPC 404 is a program for performing inter-process communications. This IPC 404 communicates with other PCs, particularly the manager PC 3 by using the network program 307. A file management program 405 implements a fileserver function by using the HD control program 308.

Figure 5:
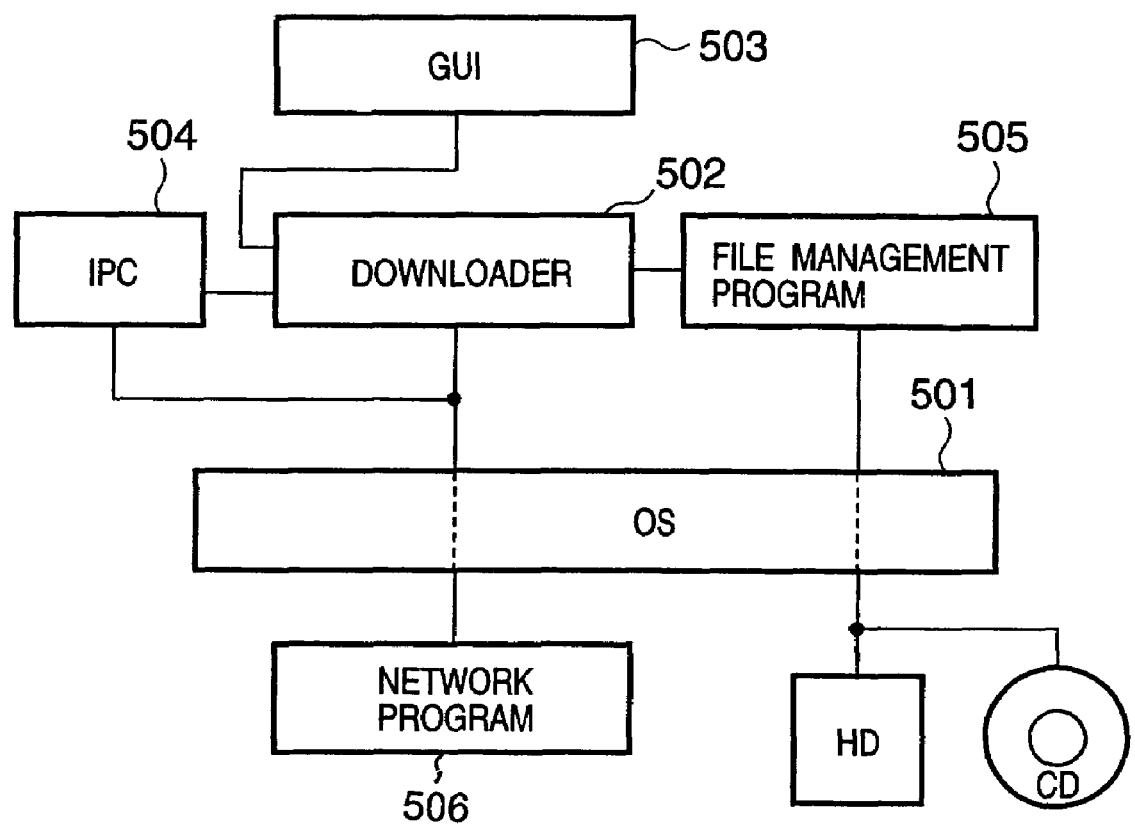
FIG. 5 is a view showing the software configuration of a manager PC 3.

FIG. 5 is a view showing the software configuration of the manager PC 3.

An OS 501 performs general processing of the manager PC. A downloader main program 502 downloads software and resources used by the software to a peripheral device.

A GUI program 503 implements a user interface function for displaying information and transferring designations from a user to the downloader. An IPC program 504 communicates with the IPC 404 of the server. A file management program 505 is usually installed as a part of the OS 501. This file management program 505 performs file management when the contents of a hard disk or CD-ROM are read out and downloaded as a file to a peripheral device via the downloader 502.

A network program 506 is commonly installed as a part of the OS 501. This network program 506 performs network communications when the contents of a hard disk or CD-ROM are read out and downloaded as a file to a peripheral device via the downloader 502.

Figure 6:
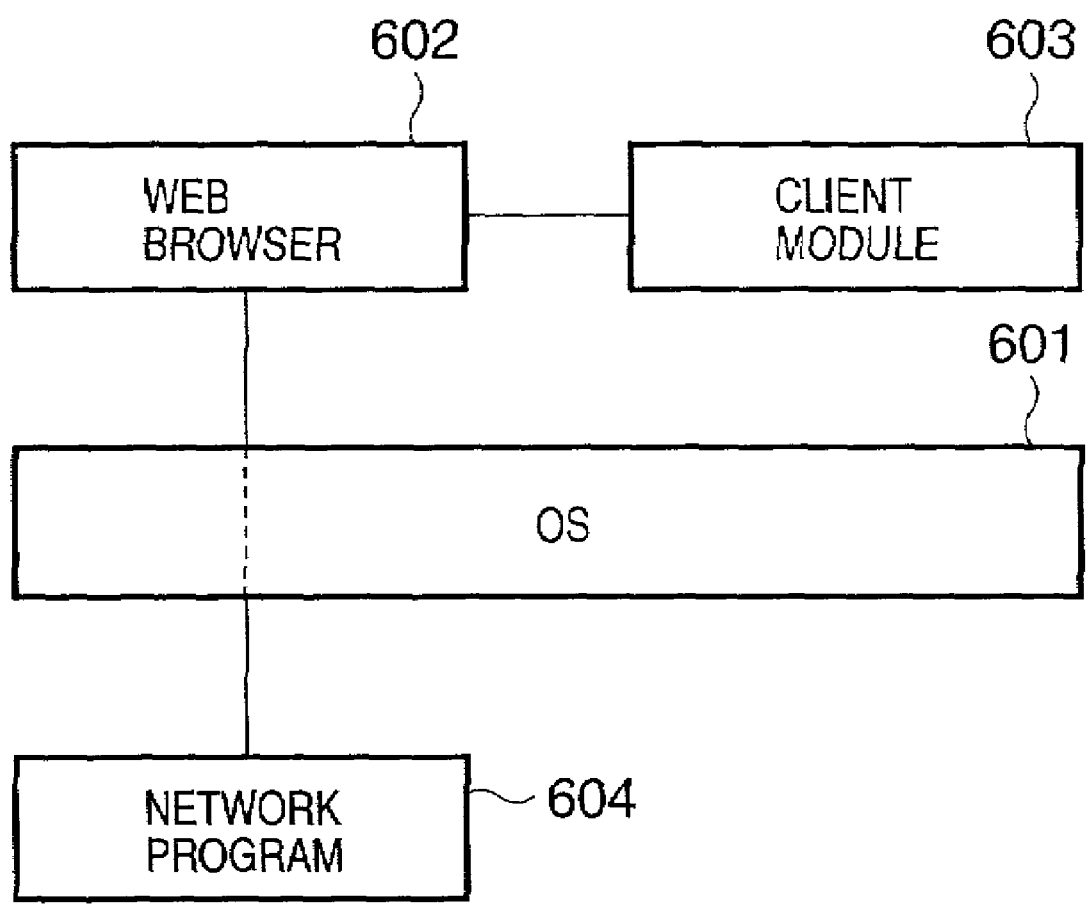
FIG. 6 is a view showing the software configuration of client PCs 4 and 5.

FIG. 6 is a view showing the software configuration of the client PCs 4 and 5.

An OS 601 performs general processing of the client PC. A Web browser 602 receives data expressed in an html format from the Web server 303 of the server 2 and displays the data on the screen, and also transfers designations from a user to the server 2 by using http.

A client module 603 processes some of data which are received by the Web browser 602 and cannot be processed by the Web browser 602. Data which cannot be processed by the Web browser 602 are, e.g., software such as printer drivers of the client PCs 4 and 5 and resources such as fonts of the client PCs 4 and 5. These data must be respectively installed in the client PCs 4 and 5 by predetermined methods. A network program 604 is usually installed as a part of the OS 601 and communicates with the Web server 301 by using http.

Figure 7:
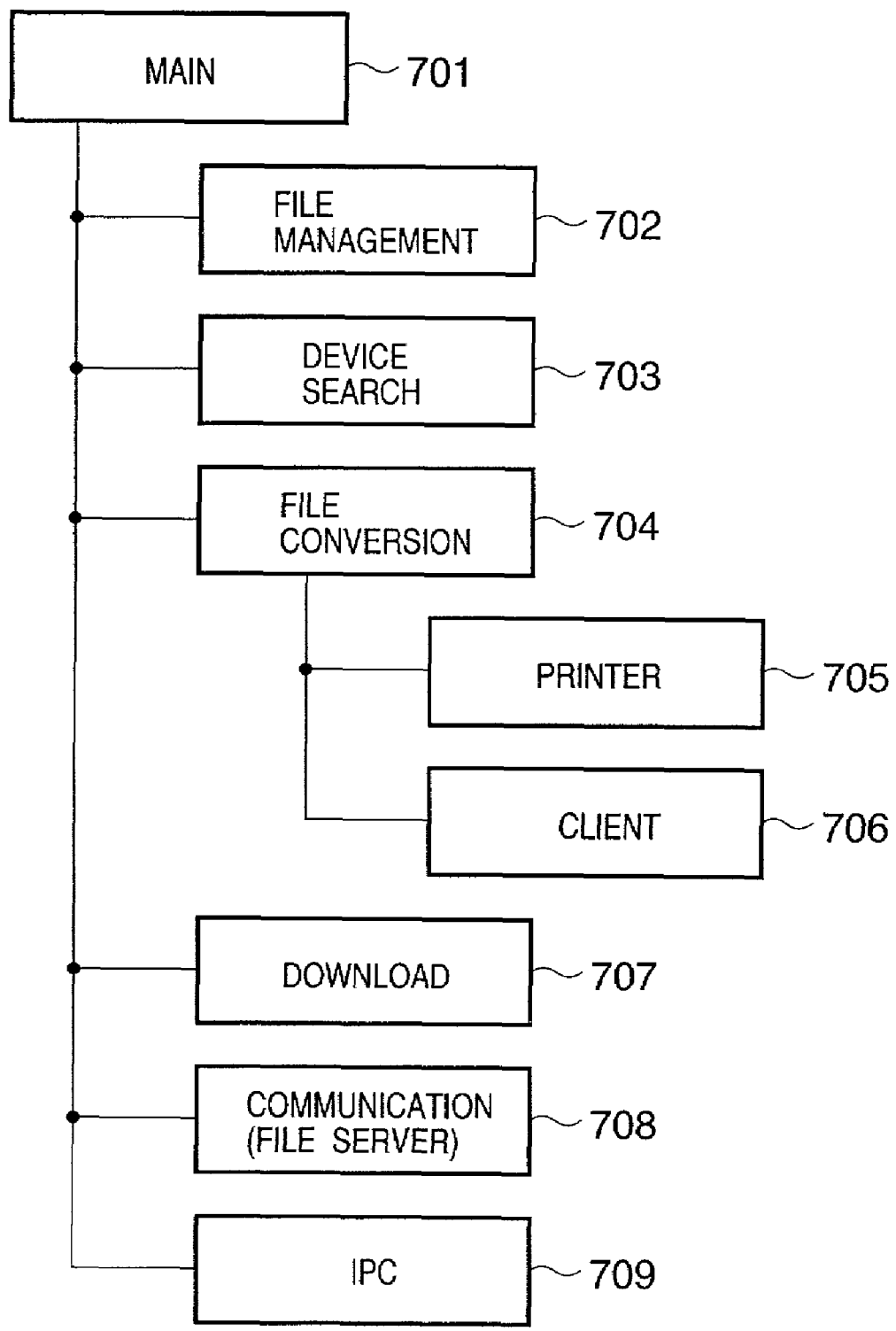
FIG. 7 is a view showing the configuration of a downloader 502.

FIG. 7 is a view showing the configuration of the downloader 502.

A main module 701 calls each module and processes parameters. A file management module 702 opens or reads a file to be downloaded by using the file management program 505. A device search module 703 searches for a downloadable peripheral device and acquires, e.g., a protocol capable of communication and the address of the device.

A file conversion module 704 converts resources used by software if the format of a resource for the printers 6 and 7 is different from the format of a resource for the client PCs 4 and 5. This file conversion module 704 contains a file conversion module 705 for the printers and a file conversion module 706 for the client PCs 4 and 5. For example, resource formats are different when the printers use fonts expressed by cubic curves whereas the client PCs 4 and 5 use fonts expressed by quadratic curves, or when the printers 6 and 7 have an overlay image expression format different from that of the client PCs 4 and 5.

A download module 707 performs download by using the network program 506. A communication module 708 communicates with the server 2 and sends resources for the client PCs 4 and 5 to the server 2. An IPC module 709 performs inter-process communications. That is, this IPC module 709 implements inter-process communications by using the IPC program 504.

Figure 8:
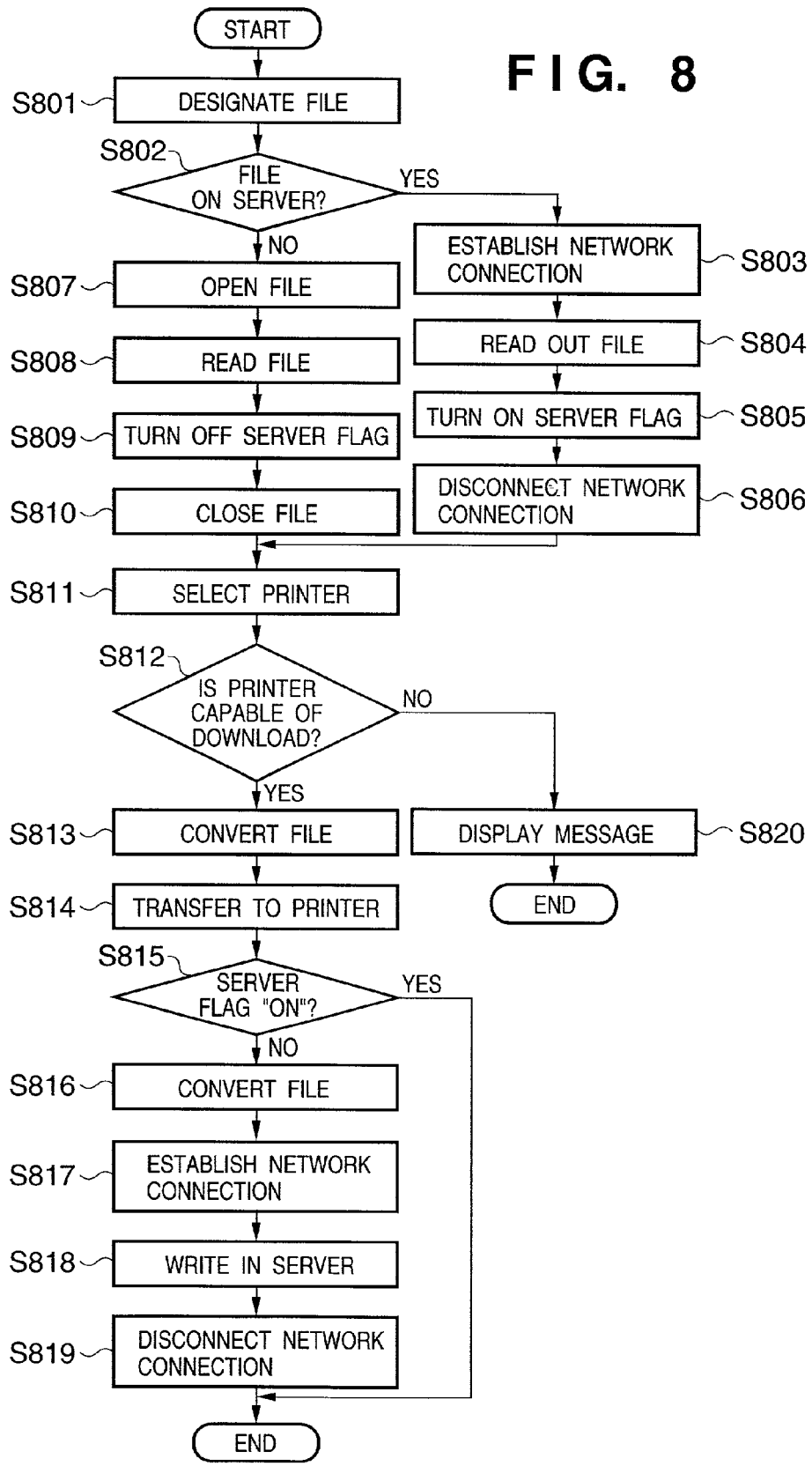
FIG. 8 is a flow chart showing processing performed by the downloader 502.

FIG. 8 is a flow chart showing the processing performed by the downloader 502.

Although download of a font will be described below, other software and resources used by the software are similarly processed. Assume that the downloader is always communicating with the server 2 and capable of acquiring file names and device names but, in order to acquire a file managed in the file server, the downloader must read out the file by separately establishing a connection.

In step S801, a file to be downloaded is designated. That is, the user of the downloader 502 designates a file by inputting the file name.

In step S802, whether the file is on the server 2 is checked. If the file is on the server 2, the flow advances to step S803. If the file is not on the server 2, the flow advances to step S807. In step S802, the file name of the file is transmitted to the server 2 and it is inquired whether the file name is registered on the server 2 to judge whether the file is on the server 2, or, a list of file names registered on the server 2 is obtained from the server 2 and it is judged whether there is the file name of the file in the list.

In step S803, a connection to the network is established. In step S804, the file is read out. In step S805, a server flag is turned on.

In step S806, the connection to the network is disconnected. In step S807, the file is opened. In step 808, the file is read. In step S809, the server flag is turned off. In step S810, the file is closed. That is, the file to be downloaded is loaded into the downloader in step S806 or S810.

In step S811, a printer is selected. In step S812, whether the printer selected in step S811 is capable of download is checked. This determination is done on the basis of the type of the printer and a built-in storage device (e.g., a RAM, flash memory, or hard disk) of the printer. If the printer type allows download and a storage device capable of download exists in the printer, it is determined that the printer is capable of download. Incidentally, information concerning the type and the storage device are obtained from the server 2.

If it is determined in step S812 that the printer is capable of download, the flow advances to step S813; if not, the flow advances to step S820. In step S813, the font file is converted into a form which can be downloaded to the printer. However, if the font file is already in a downloadable form, nothing is performed.

In step S814, the font file in the downloadable form is transferred to the printer. In step S815, whether the server flag is ON is checked. If the flag is ON, it is determined that a client file already exists in the server 2, so the processing is completed. If the server flag is not ON (i.e., is OFF), the flow advances to step S816.

In step S816, the font file is converted into a form usable by the client PC. However, if the font file is already in a form usable by the client PC, nothing is performed.

In step S817, a connection to the server 2 via the network is established. In step S818, the font file for the client PC is written in the server 2. In step S819, the connection is disconnected, a network closing process is performed, and the processing is completed.

In step S820, a message indicating that the file cannot be downloaded to the printer is displayed, and the processing is terminated.

By the above processing, the client PC font file corresponding to the font file downloaded to the printer necessarily exists in the server 2. Font file conversion is performed by converting the font file format itself or by adding header information and the like. For example, to download a TrueType (registered trademark) font file into a printer containing a TrueType rasterizer, the font file must be downloaded by adding header information for the printer. Therefore, the file conversion process adds this header information for the printer and the like. When this font is to be used on a Mac OS, information called a FOND resource is added as additional information.

Figure 9:
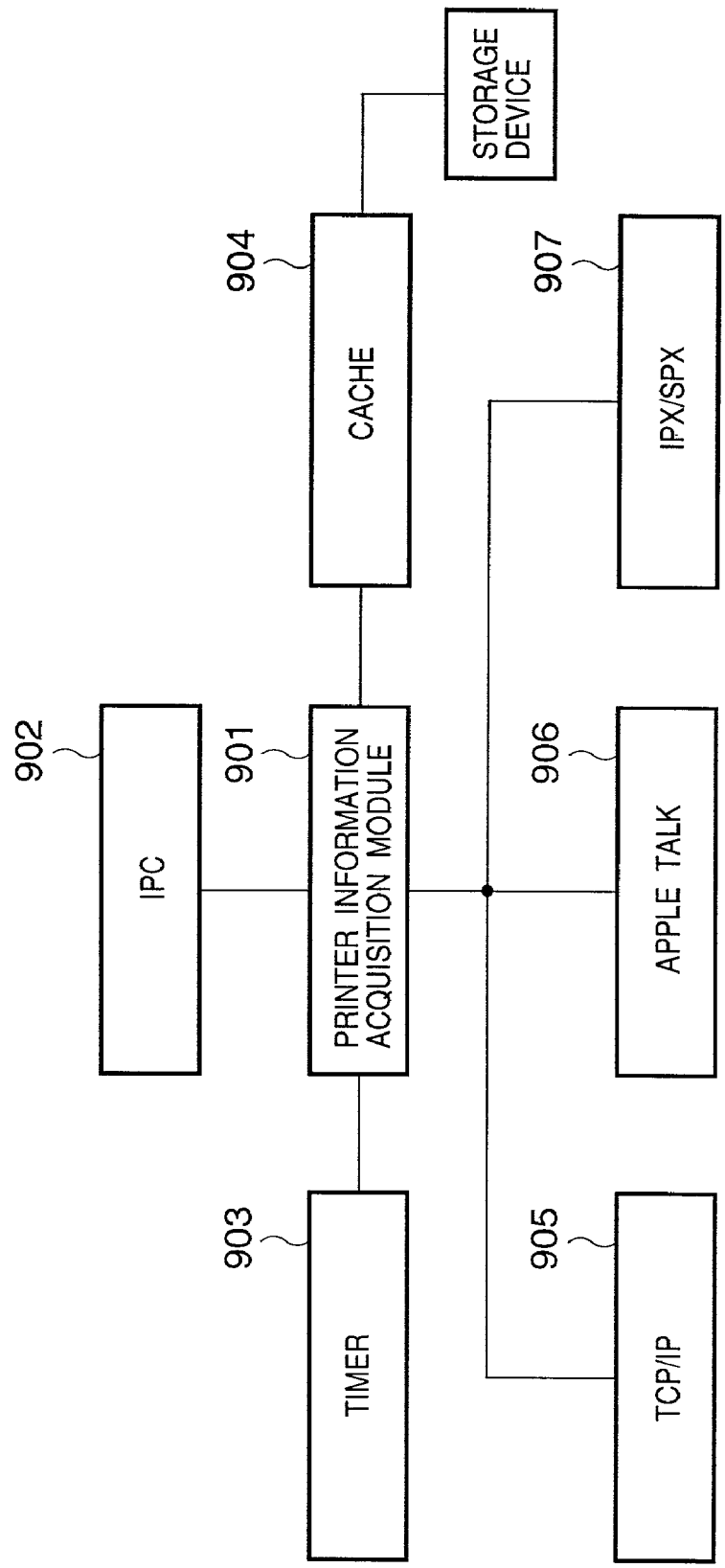
FIG. 9 is a view showing the configuration of a peripheral device information acquisition module 4031.

FIG. 9 is a view showing the configuration of the peripheral device information acquisition module 4031.

Main processing 901 of this peripheral device information acquisition module performs overall control, communication, management, processing when an interrupt occurs, and exchange of download data with respect to a peripheral device. IPC 902 exchanges information with another module by inter-process communication.

A timer module 903 generates interrupts at predetermined intervals. The main processing 901 so operates as to acquire information of a peripheral device at the timing of each interrupt. A cache management process 904 temporarily stores peripheral device information acquired by the timer interrupt and, when instructed to send data by the IPC, sends the information in the cache to another module via the IPC.

A TCP/IP module 905 exchanges data with peripheral devices capable of acquiring information and downloading data by TCP/IP. An Apple Talk module 906 exchanges data with peripheral devices capable of acquiring information and downloading data by Apple Talk. An IPX/SPX module 907 exchanges data with peripheral devices capable of acquiring information and downloading data by IPX/SPX. Protocols other than these protocols can, of course, be handled.

Figure 10B:
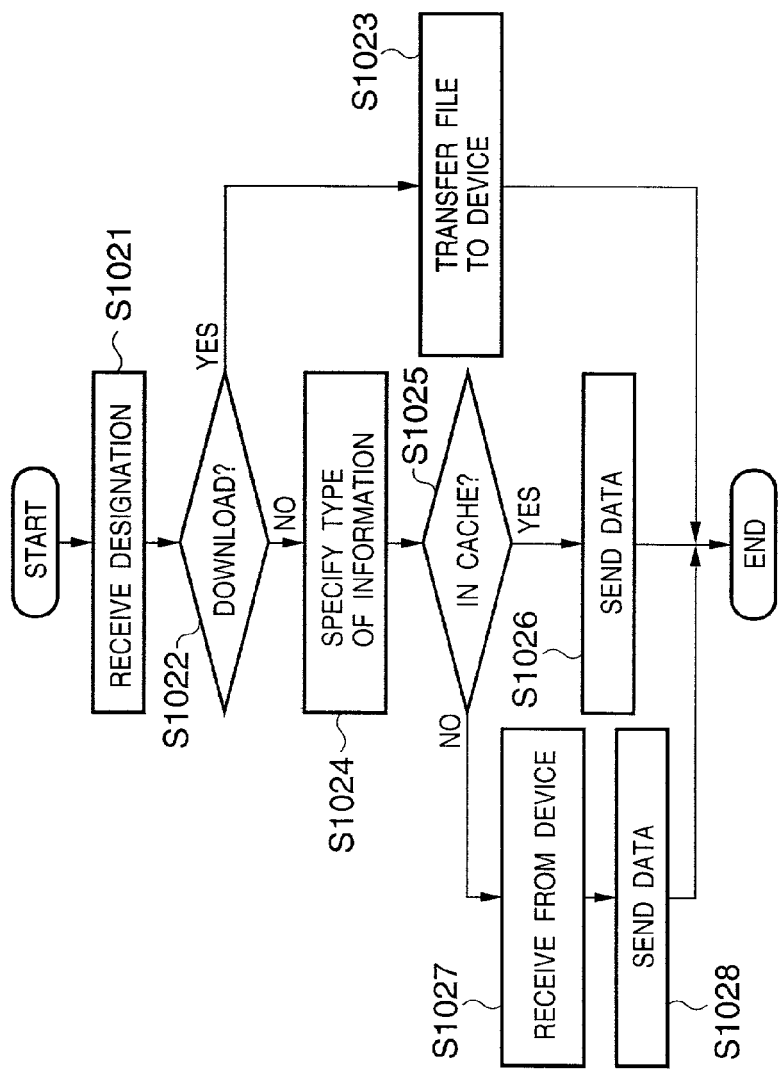
FIG. 10B is a flow chart showing the procedure of normal processing.
Figure 10A:
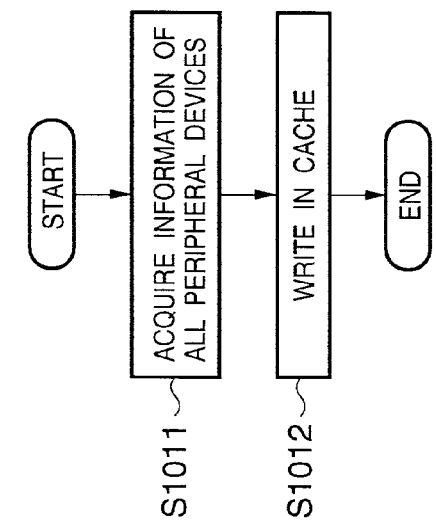
FIG. 10A is a flow chart showing the procedure of peripheral device information acquisition by an interrupt.

FIG. 10A is a flow chart showing the procedure of peripheral device information acquisition by an interrupt. When an interrupt occurs, this processing is executed.

In step S1011, information is acquired from all peripheral devices as objects. The acquired information contains the version of software, the version of a resource used by the software, the file size, the date, and the typeface name if the file is a font, i.e., this information is for checking whether the software and the resource used by the software are not changed. In step S1012, the acquired information is written in the cache 904.

FIG. 10B is a flow chart showing the procedure of normal processing.

In this normal processing, information is acquired or downloaded in accordance with user designations received by a module having a user IF. In step S1021, designations from the user IF module are received via the IPC. The contents received by the designations are contents to be processed, data to be downloaded, the address of a peripheral device, and the like.

In step S1022, whether download is to be performed is checked. If YES in step S1022, the flow advances to step S1023. If NO in step S1022, the flow advances to step S1024. In step S1023, transmitted data is downloaded to a designated peripheral device, and the processing is completed.

In step S1024, the type of necessary information is specified. The type of information is, e.g., the typeface name, form size, or software version. In step S1025, whether the required information exists in the cache 904 is checked. If YES in step S1025, the flow advances to step S1026. If NO in step S1025, the flow advances to step S1027.

In step S1026, the data is transmitted from the cache 904 via the IPC 902. In step S1027, the data is acquired from the peripheral device. In step S1028, the acquired data is transmitted via the IPC 902, and the processing is completed.

Figure 11:
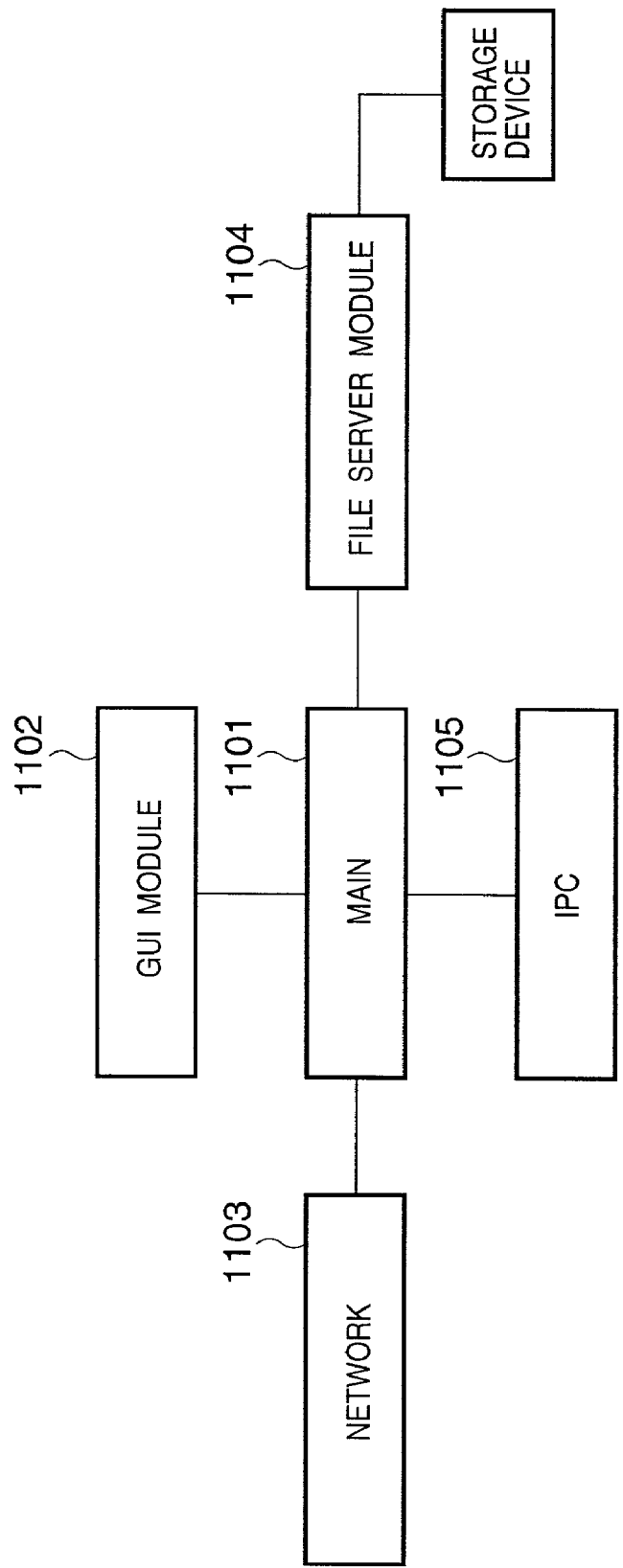
FIG. 11 is a view showing the configuration of a main module of a management program 401.

FIG. 11 is a view showing the configuration of a main module of the management program 401.

Main processing 1101 performs overall operation management and distribution of processing. A GUI module 1102 performs information exchange, e.g., sends information to be displayed to the GUI and receives processing and data from the GUI. Network processing 1103 inputs and outputs files and information via the network. A file server module 1104 performs read, write and management of files.

IPC processing 1105 exchanges data and information with the IPC 902 by inter-process communication. That is, this program can access peripheral devices, the GUI, the network, and the file server and controls the overall operation.

Figure 12:
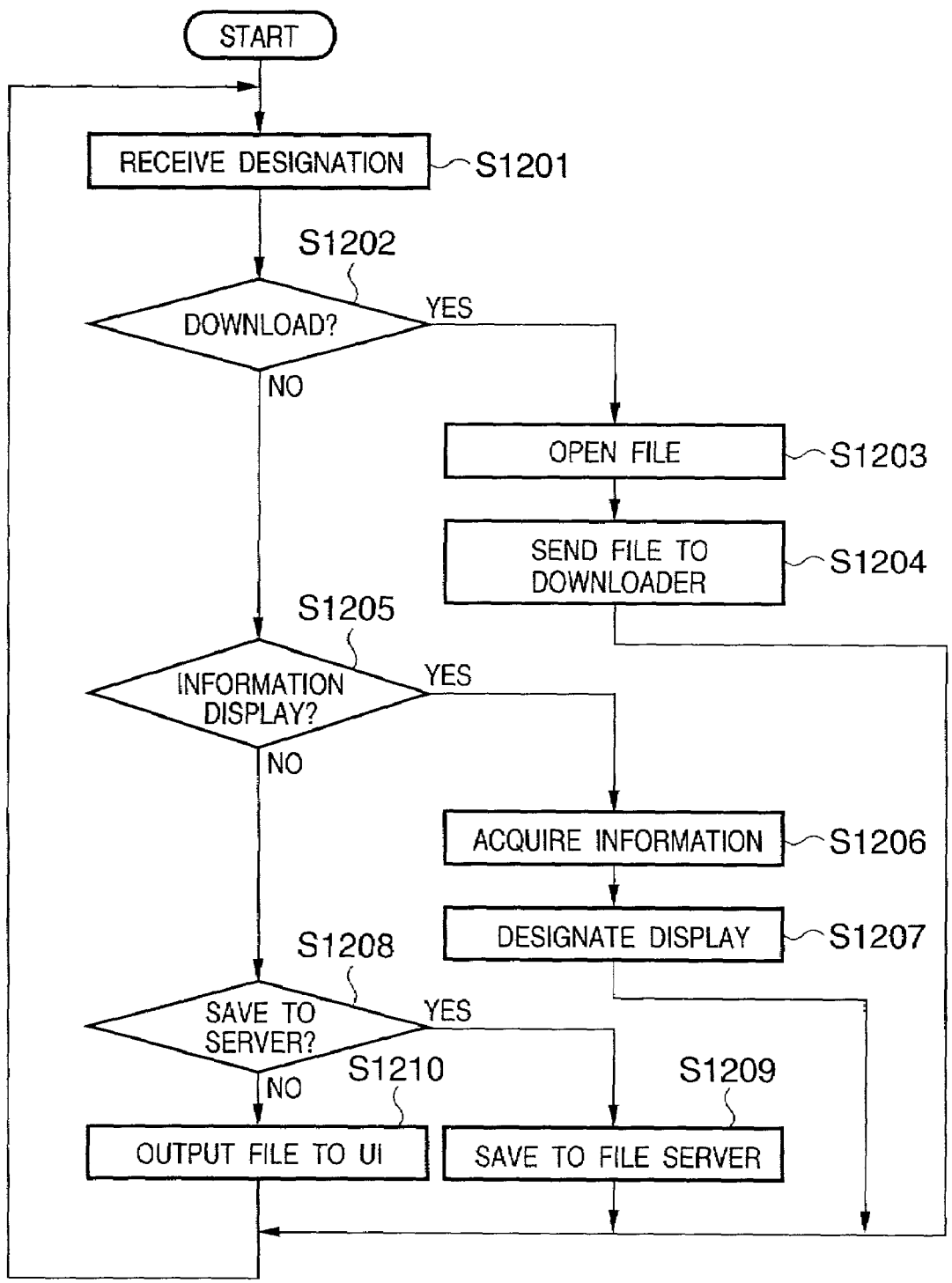
FIG. 12 is a flow chart showing the processing of the software shown in FIG. 11.

FIG. 12 is a flow chart showing the processing performed by the software shown in FIG. 11.

In step S1201, designation is received. In step S1202, whether the designation is download is checked. If the designation is download, the flow advances to step S1203; if not, the flow advances to step S1205. If the designation is found to be download, this module fetches a file to be downloaded from the file server and sends the fetched file to the downloader. Futher, the file name of the file to be downloaded is also received if the designation is download.

In step S1203, the file on the file server is opened. In step S1204, the file is sent to the downloader via the network module 1103. After that, the flow returns to step S1201 to perform the next processing. In step S1205, whether the designation is information display is checked. If the designation is information display, the flow advances to step S1206; if not, the flow advances to step S1208. If the designation is found to be information display, information in a peripheral device is transmitted in accordance with designation from the GUI communication module 1102.

In step S1206, information exchange is performed between the IPC 902 and the IPC 1105 to acquire the information of the peripheral device. In step S1207, the information to be displayed is output via the GUI module 1102. After that, the flow returns to step S1201 to perform the next processing.

In step S1208, whether the designation is save of a file to the server is checked. If the designation is save of a file to the server, the flow advances to step S1209; if not, the flow advances to step S1210. Save of a file to the server is performed by designation from the downloader, and the file is transmitted via the network.

In step S1209, the file is saved in the file server. After that, the flow returns to step S1201 to perform the next processing. In step S1210, the file is output via the GUI. This is to output a client PC resource or the like. That is, the GUI outputs the file or the like to a client PC by using http which is a protocol by which the GUI communicates with a client PC. After that, the flow return to step S1201 to perform the next processing. By a series of these processes, information and data in this module are transmitted and received.

Figure 13:
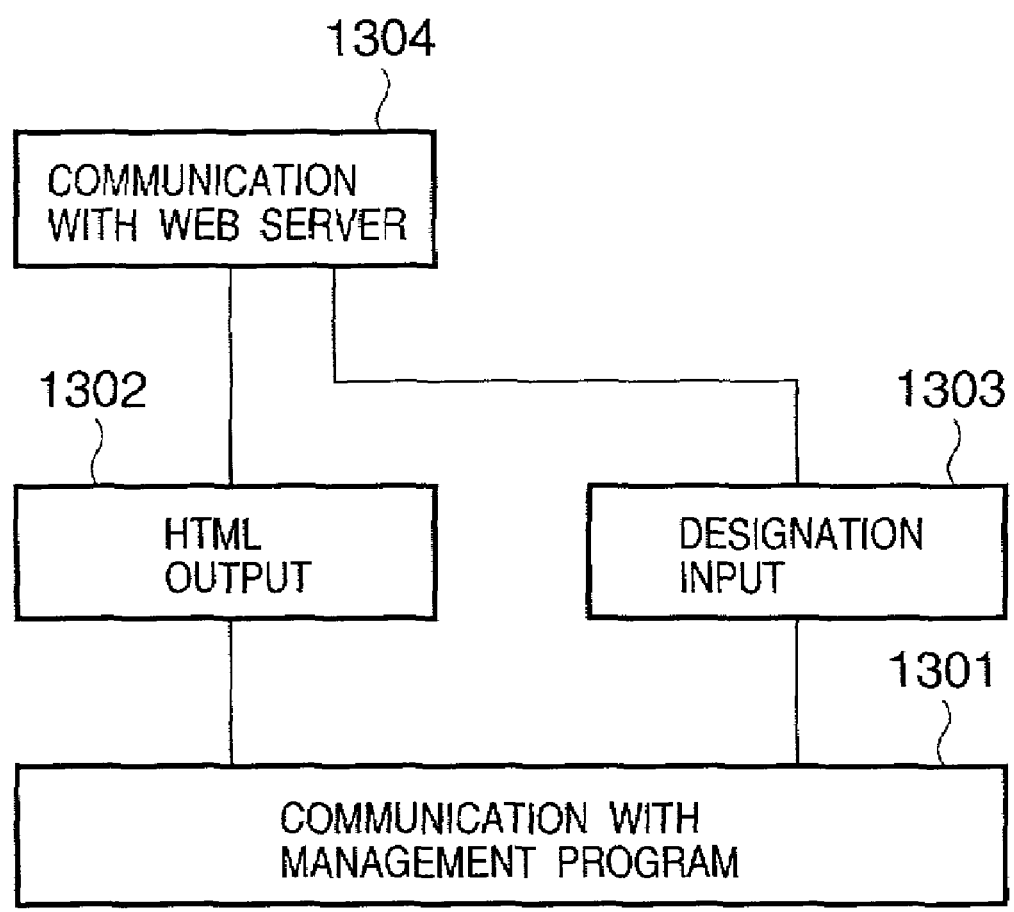
FIG. 13 is a view showing a GUI module 1102.

FIG. 13 is a view showing the GUI module 1102.

A module 1301 communicates with the management program 401 to receive designations, files, and information from the management program 401 and transfers them to an html output module 1302. This module 1301 also transfers designations and files received from a designation input module 1303 to the management program.

The html output module 1302 forms a GUI frame file based on html standards using information and designations received from the management program, and transfers the file to a communicating means 1304 which communicates with the Web server. The designation input module 1303 receives designations or archived or encoded files from the Web server, and transfers the designations as instructions to the management program. The designation input module 1303 transfers, to the management program, the archived files after separating them and the encoded files after decoding them. The communicating means 1304 which communicates with the Web server sends html information to the Web server 303 and transfers designations from the Web server 303 to the designation input module 1303.

Figure 14:
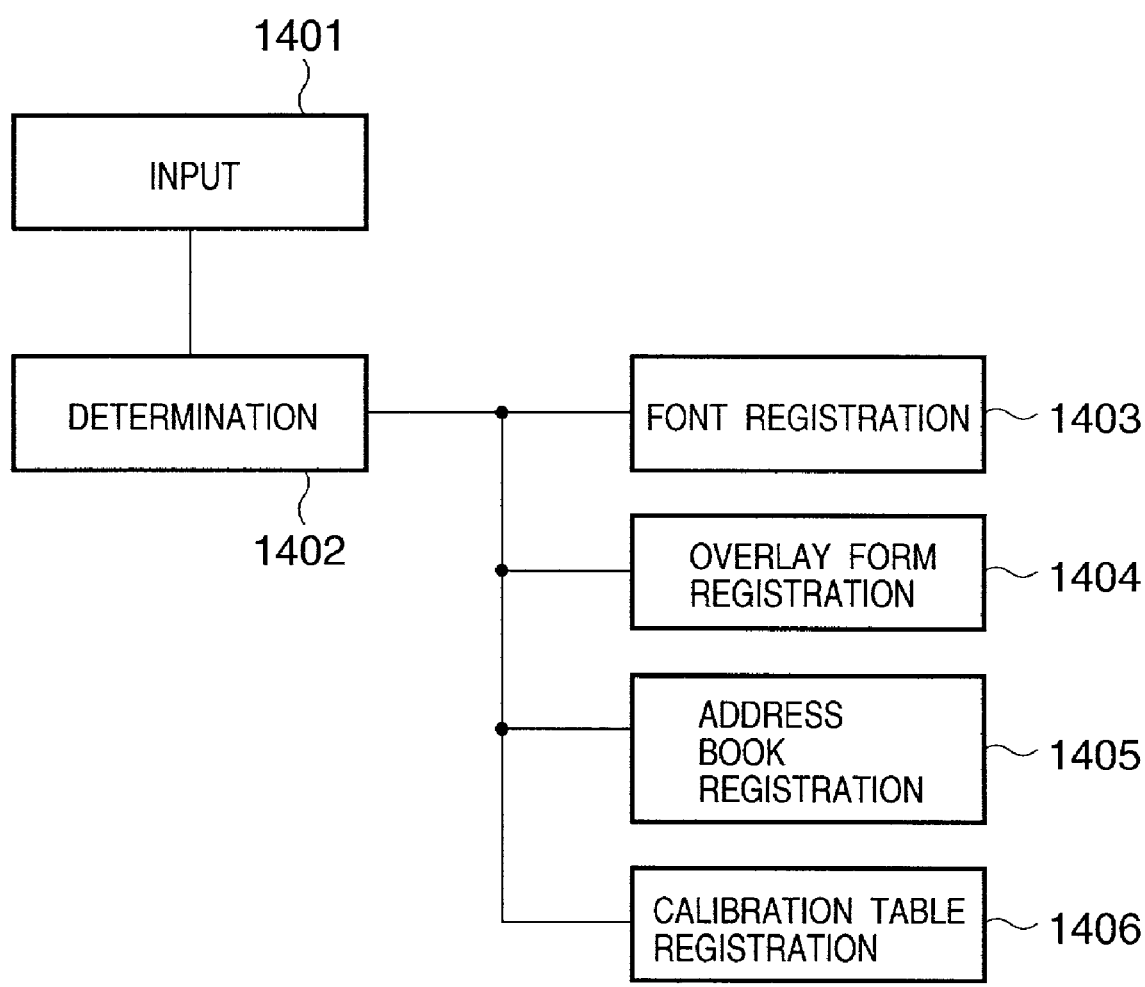
FIG. 14 is a view showing the configuration of a client module.

FIG. 14 is a view showing the configuration of the client module. This module is installed in the client PCs 4 and 5 and processes files received by the Web browser.

An input means 1401 receives data from the Web browser. The received data is usually archived data containing management information and a file entity. A determining means 1402 separates the received file into the management information and the file entity, and determines the type of the file on the basis of the management information.

The management information contains, e.g., the type of file, the file name, and the file size. If the file type represents a font, the determining means 1402 calls a module 1403. If the file type is an overlay form, the determining means 1402 calls a module 1404. If the file type represents an address book, the determining means 1402 calls a module 1405. If the file type represents a color calibration table, the determining means 1402 calls a module 1406.

Reference numeral 1403 denotes a font registration module which registers a received font in a client PC. Reference numeral 1404 denotes an overlay form registration module which registers a received file in an overlay form processing application. When no overlay processing application is installed, this overlay form registration module 1404 does not perform any processing.

Reference numeral 1405 denotes an address book registration module which registers a received address book after converting it into the format of a registration destination, e.g., e-mail management software or a FAX driver. Reference numeral 1406 denotes a color calibration table registration module which registers a received file in a printer driver for performing image processing.

Figure 15:
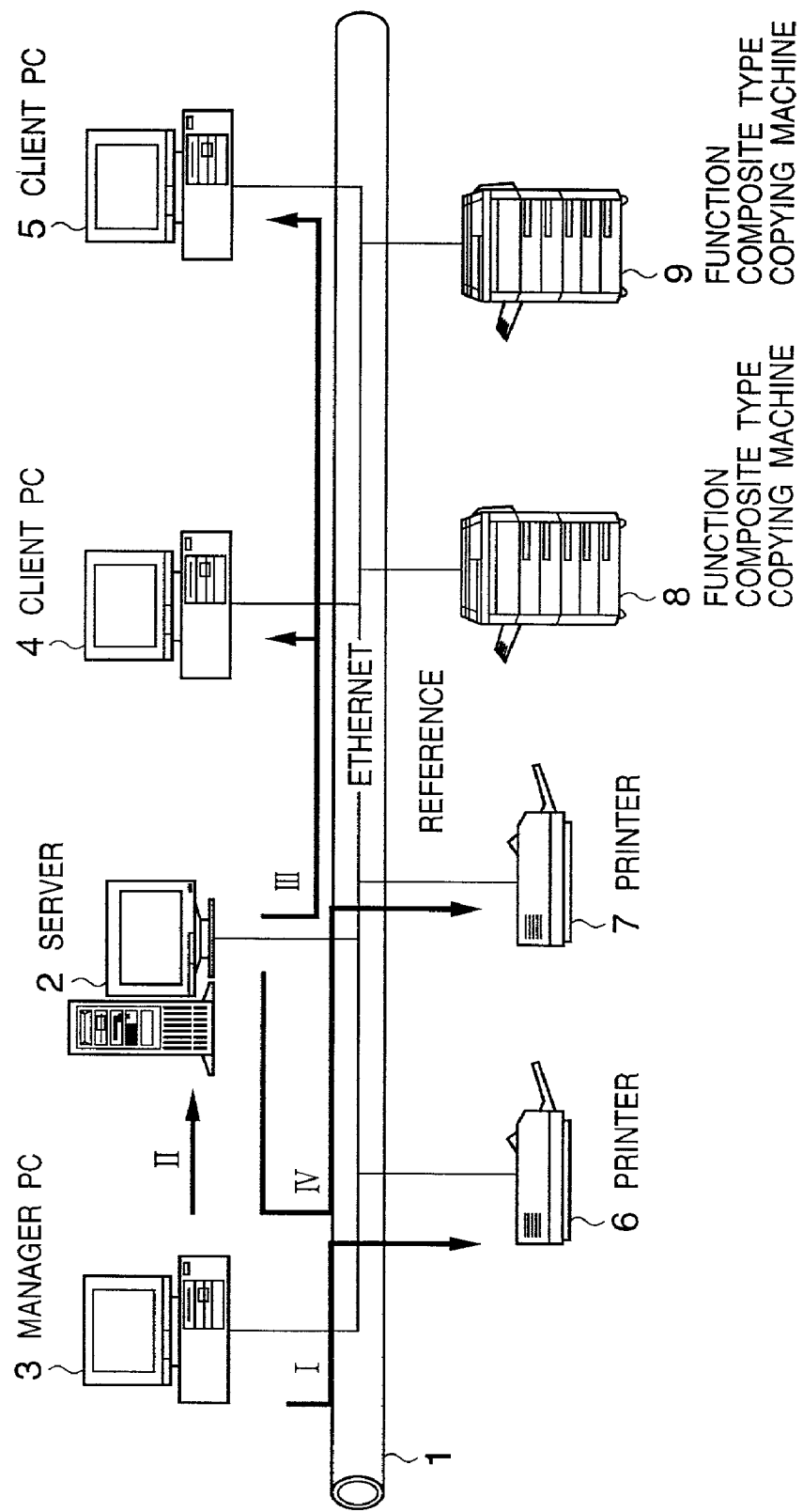
FIG. 15 is a view showing the flow of data when a font is downloaded.

FIG. 15 is a view showing the flow of data when a font is downloaded.

A font loaded from a CD to the manager PC 3 by the manager is downloaded to the printer 6 (①). The font is then registered in the server 2 (②). The client PCs 4 and load the client PC font file from the server 2 by using the Web browser 602 and register the file in the system by the client module 603 (③). To download the font to the other printer, the manager PC 3 loads the font registered in the server 2 and downloads the font to the printer 7 (④) The operation is the same when an overlay form is to be registered from a PC.

Figure 16:
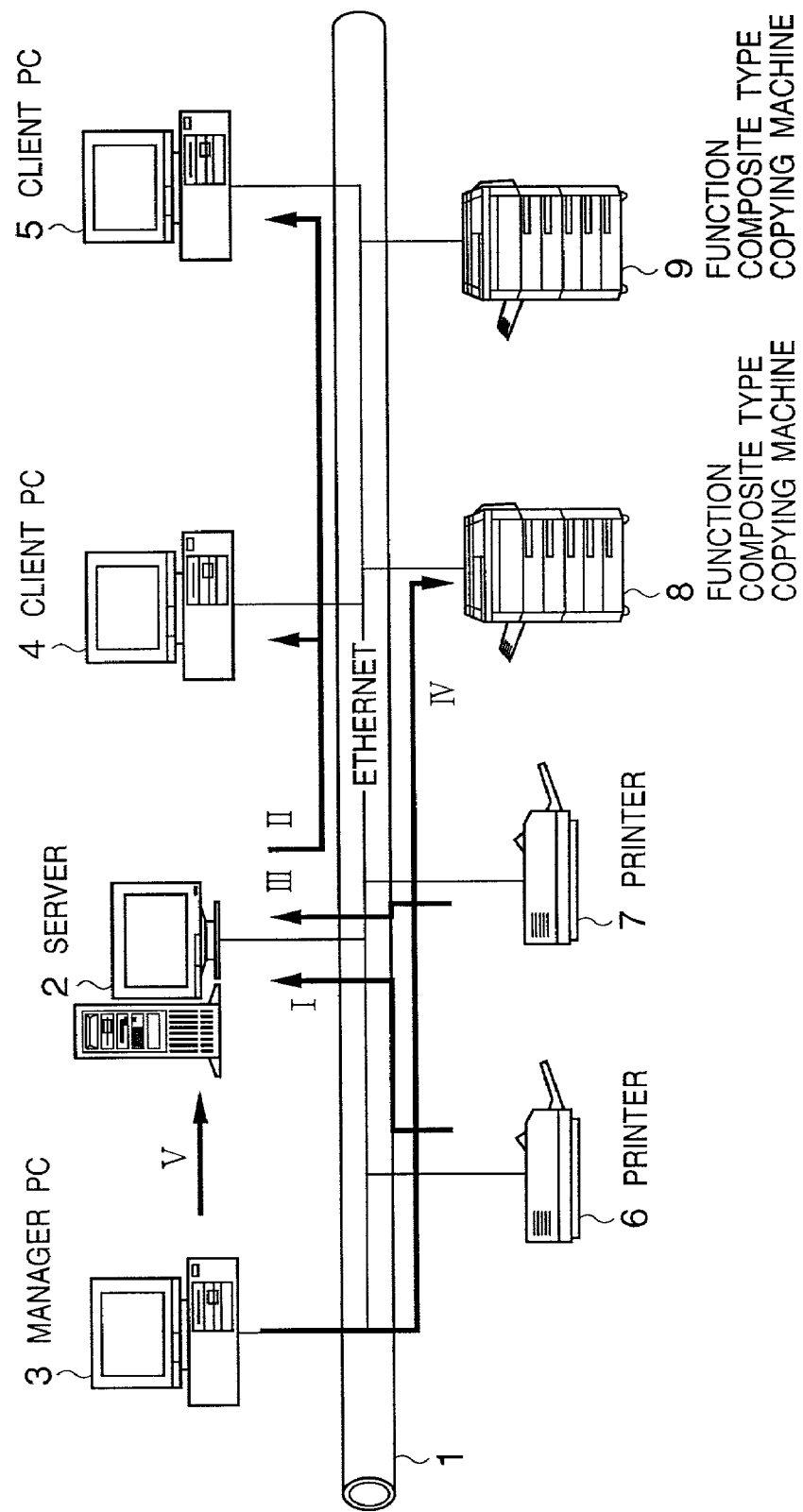
FIG. 16 is a view showing the flow of data when a client PC acquires a color calibration table.

FIG. 16 is a view showing the flow of data when a client PC acquires a color calibration table.

A color calibration table generated in the printer 6 is transmitted to the server 2 (①). The client PC 4 receives this color calibration table of the printer 6 by using the Web browser and registers the table in the printer driver (②). A color calibration table generated in the printer 7 is transmitted to the server 2 (③). If the client PC 4 is to receive this color calibration table of the printer 7, processing is the same as in (②). ① and ③ are periodically carried out by interrupt processing. ④ indicates the flow of data when a color calibration table is to be downloaded from the manager PC 3. That is, when a calibration table is formed by the manager PC 3 by using colorimetry software or the like, this calibration table is downloaded from the manager PC 3. The same data as the downloaded data is directly transmitted from the manager PC 3 to the server 2. The data is transferred from the server 2 to the client PC 4 or 5 in the same manner as for a color calibration table generated in a printer. When image data input by a scanner is to be transferred to a printer driver so as to be used as an overlay form, the flow of data is identical with that of a color calibration table generated in a printer.

Figure 17:
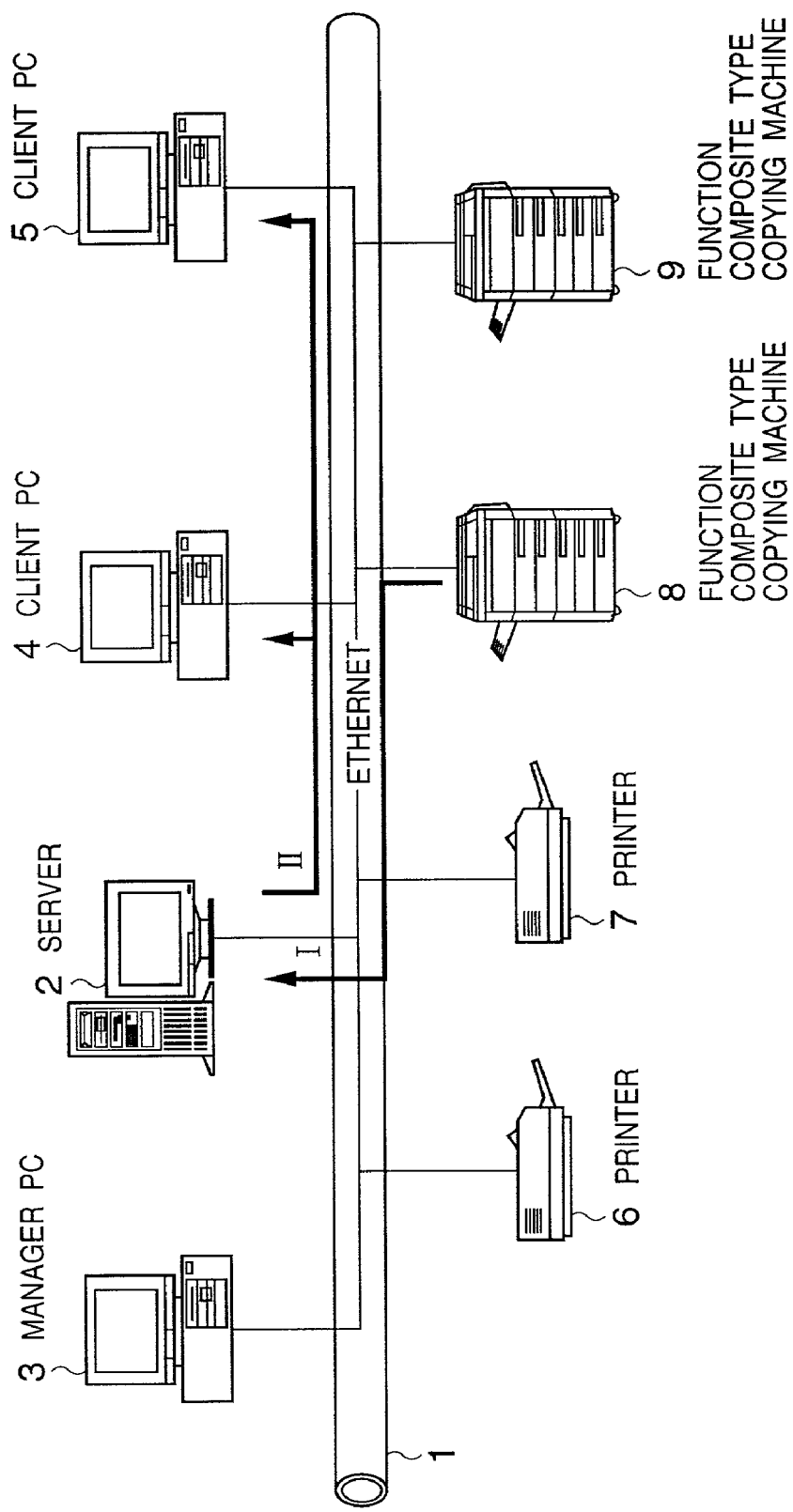
FIG. 17 is a view showing the flow of data when address book data is acquired from a function composite type copying machine.

FIG. 17 is a view showing the flow of data when address book data is acquired from the function composite type copying machine 8 or 9.

Figure 18:
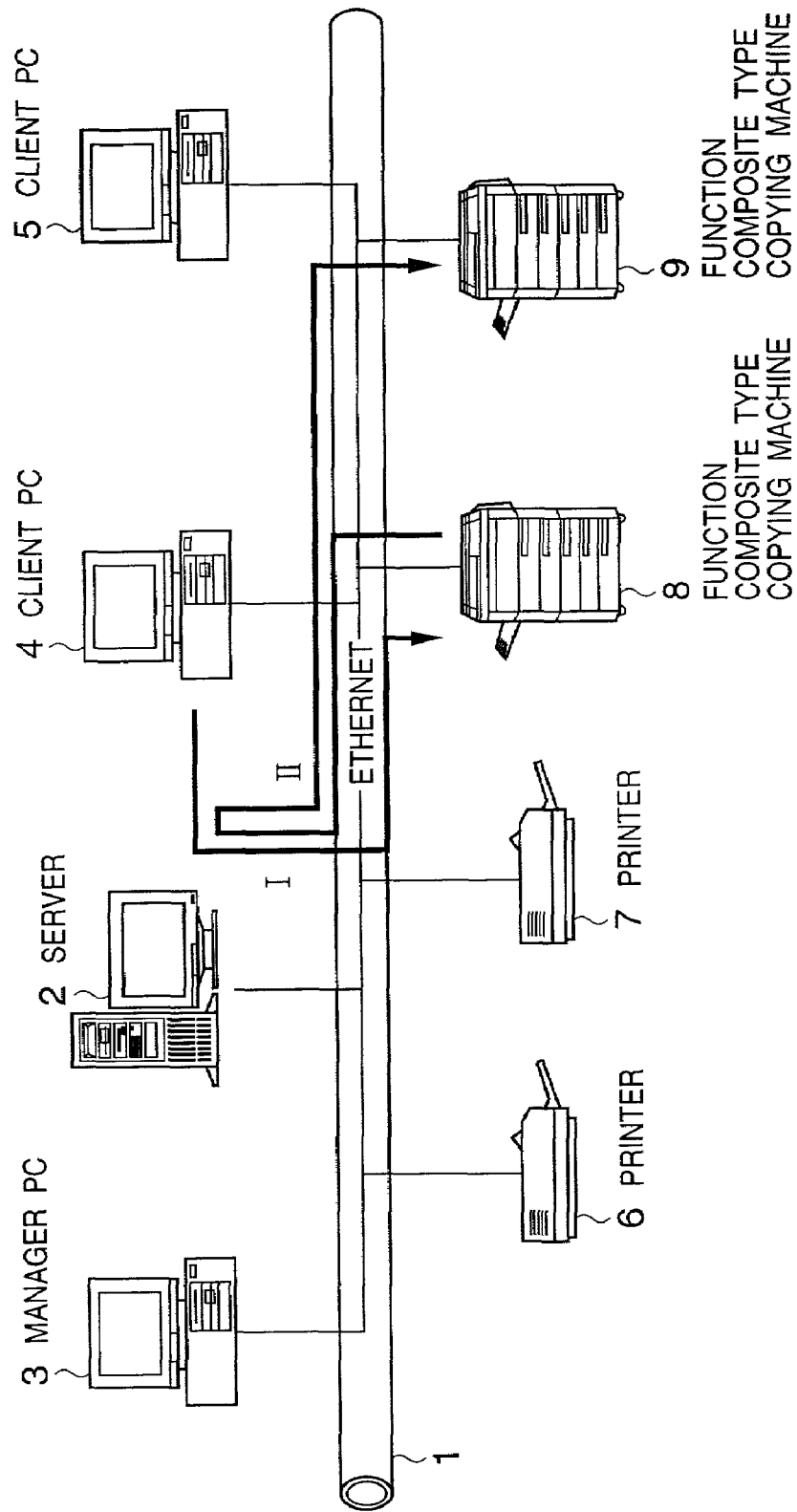
FIG. 18 is a view showing the flow of data when address book data on a client PC is downloaded to a function composite type copying machine.

Address book data in the function composite type copying machine 8 is sent to the server (①). The client PC 4 or 5 receives the data from the server 2, and the client module 603 adds the data to or overwrites the data on address book data in the client PC 4 or 5 (②) FIG. 18 is a view showing the flow of data when address book data on the client PC 4 or 5 is downloaded to the function composite type copying machine 8 or 9.

Address book data sent to the server 2 by using the Web browser is directly written in the function composite type copying machine 8 (①). ② indicates the flow of data when the address book of this function composite type copying machine is to be copied. The data of the function composite type copying machine 8 is once transmitted to the server 2 and written in the function composite type copying machine 9.

Figure 19:
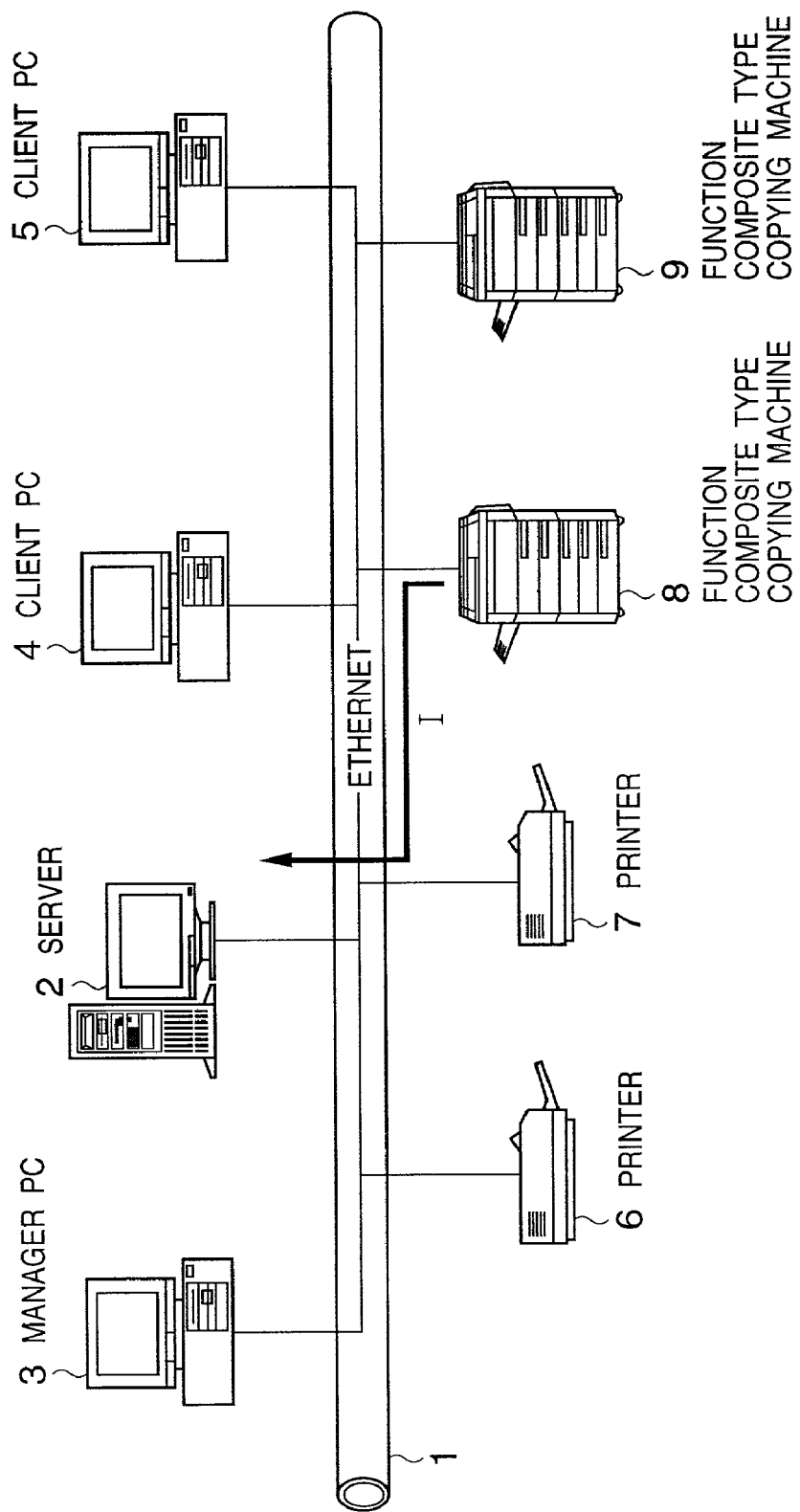
FIG. 19 is a view showing the flow of data when the contents of a storage device of a printer or of a function composite type copying machine are backed up.

FIG. 19 is a view showing the flow of data when the contents of the storage device of the printer 4 or 5 or of the function composite type copying machine 8 or 9 are backed up. Although this processing is normally designated and activated by the Web browser, it can also be designated and activated from the operation panel of the function composite type copying machine 8 or 9.

The contents of the storage device of the printer or of the function composite type copying machine are sent to the server 2 and stored in the internal file server of the server (①).

Figure 20:
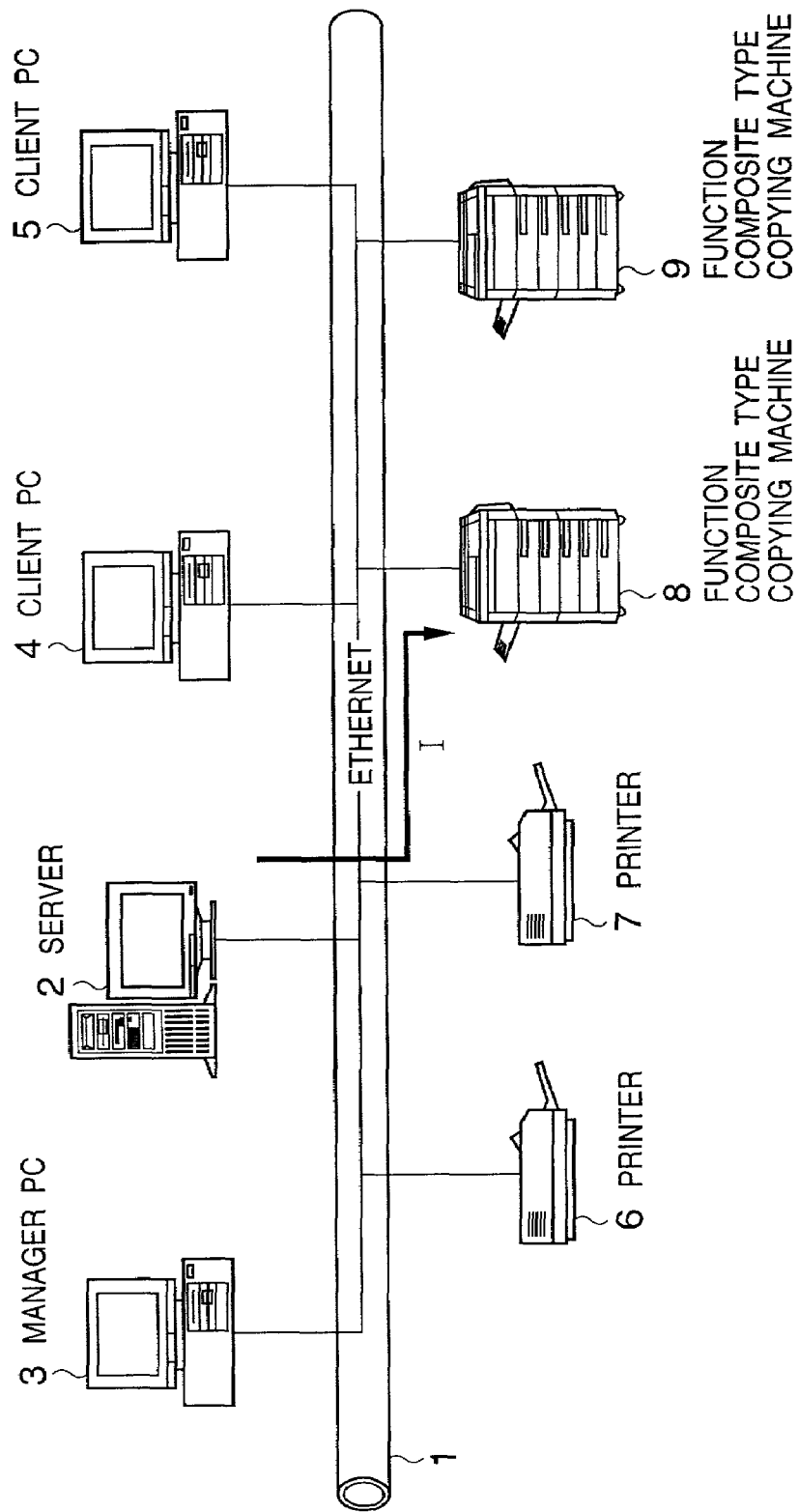
FIG. 20 is a view showing the flow of data when the backed-up contents of the storage device of the printer or of the function composite type copying machine are restored.

FIG. 20 is a view showing the flow of data when the backed-up contents of the storage device of the printer 4 or 5 or of the function composite type copying machine 8 or 9 are restored. This processing is usually designated and activated by the Web browser, but it can also be designated and activated from the operation panel of the function composite type copying machine 8 or 9.

The data backed up in the internal file server of the server 2 is sent to the storage device of the printer or of the function composite type copying machine 8 as the backup source (①).

Figure 21:
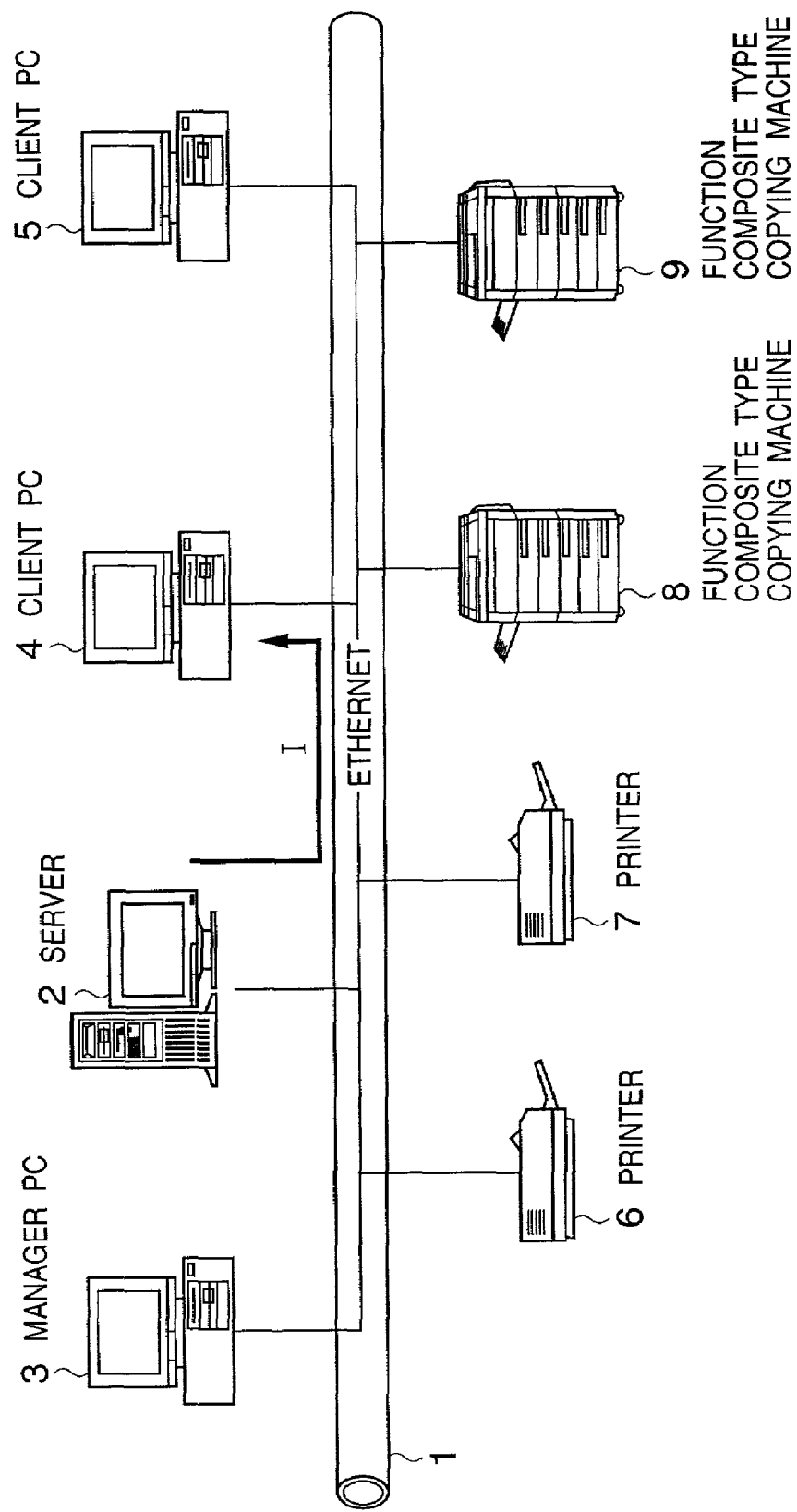
FIG. 21 is a view showing the flow of data when the client PC 4 or 5 acquires software from the server 2.

FIG. 21 shows the flow of data when the client PC 4 or 5 acquires software from the server 2. Data is acquired from the server 2, and the client module 603 decodes and installs the data (①).

Figure 22:
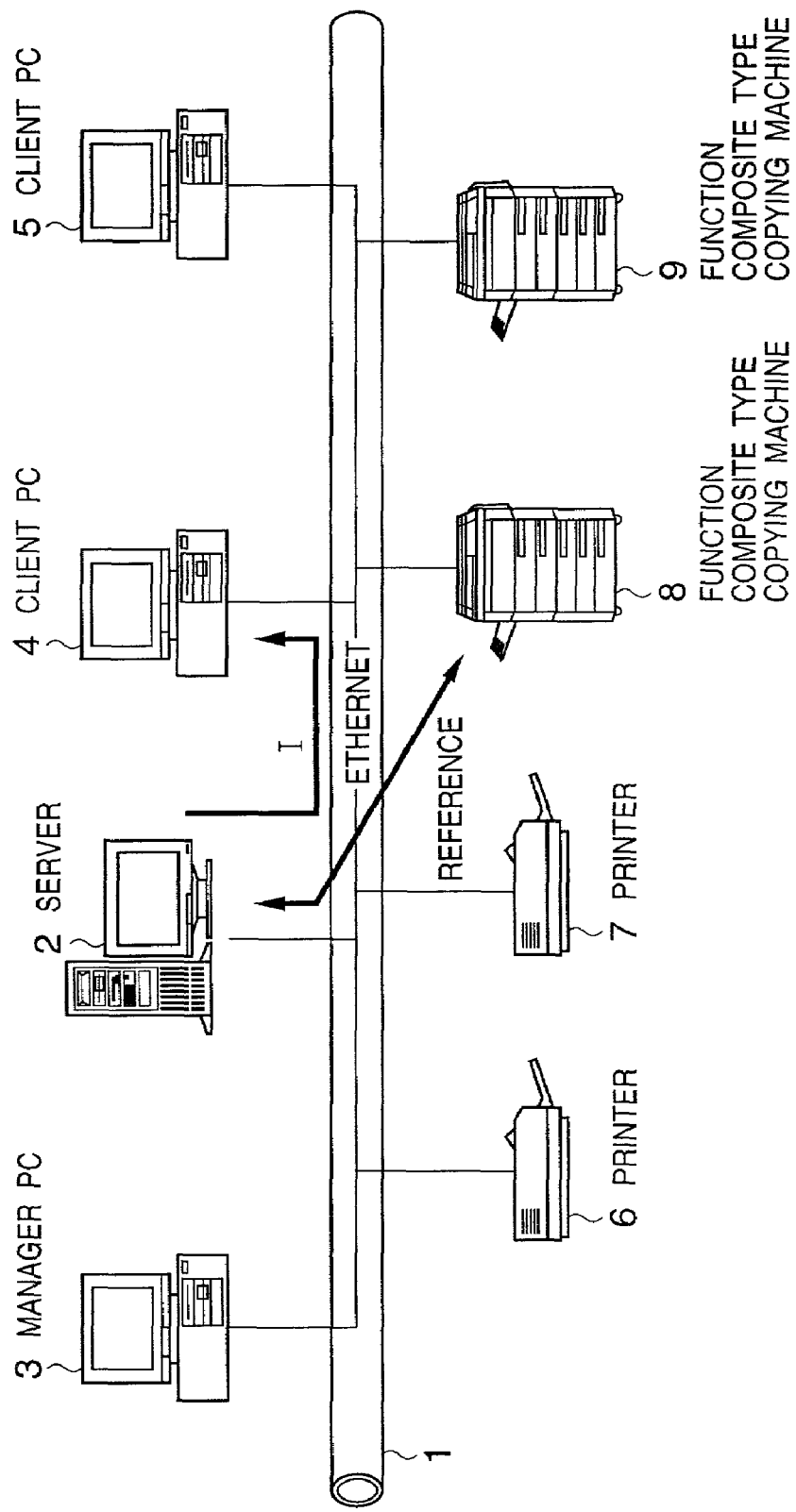
FIG. 22 is a view showing the flow of data when the client PC 4 or 5 acquires a driver of a peripheral device, such as a printer driver, facsimile driver, or scanner driver, from the server 2.

FIG. 22 shows the flow of data when the client PC 4 or 5 acquires a driver of a peripheral device, such as a printer driver, facsimile driver, or scanner driver, from the server 2.

Data is acquired from the server 2 (①). When sending this data, however, the server 2 refers to a peripheral device of interest to obtain matching with this peripheral device. That is, the server 2 sends the network address, device type, functions, and the like together with the device driver to the client PC 4 or 5. On the basis of these pieces of information sent from the server 2, the client module 603 installs the driver.

Figure 23:
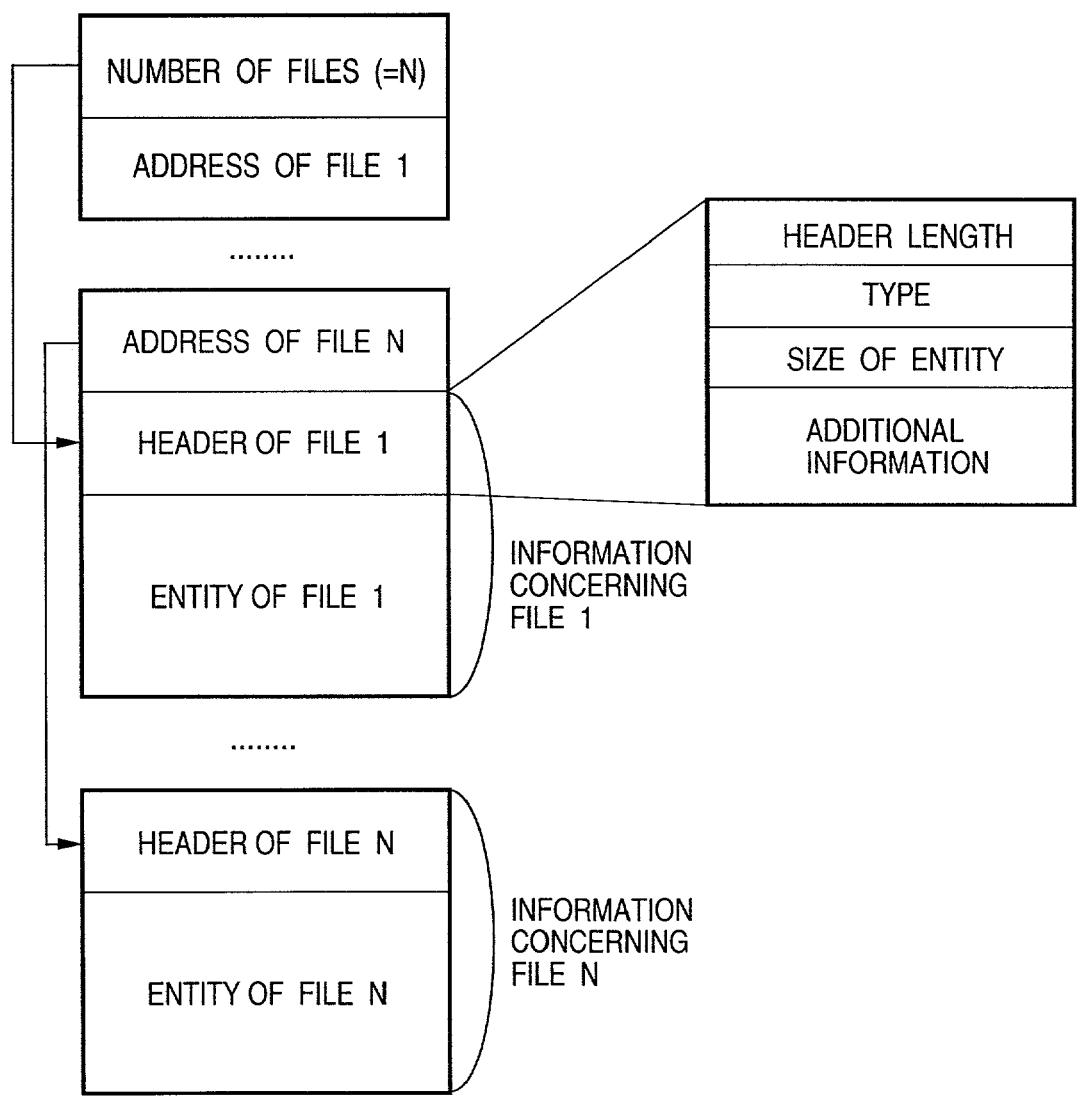
FIG. 23 is a view showing a data structure when the server 2 sends data to the client PC 4 or 5.

FIG. 23 is a view showing a data structure when the server 2 sends data to the client PC 4 or 5. As shown in FIG. 23, the number N of files held as an archive inside the data is set in the start position. The array of N addresses follows, and a file entity held together with a header exists in a position indicated by each address. The header contains the header length, the type of the file, and the size of the entity. If additional information is present, it follows the header. That is, the file entity exists after the header length from the start position of the header.

Figure 24:
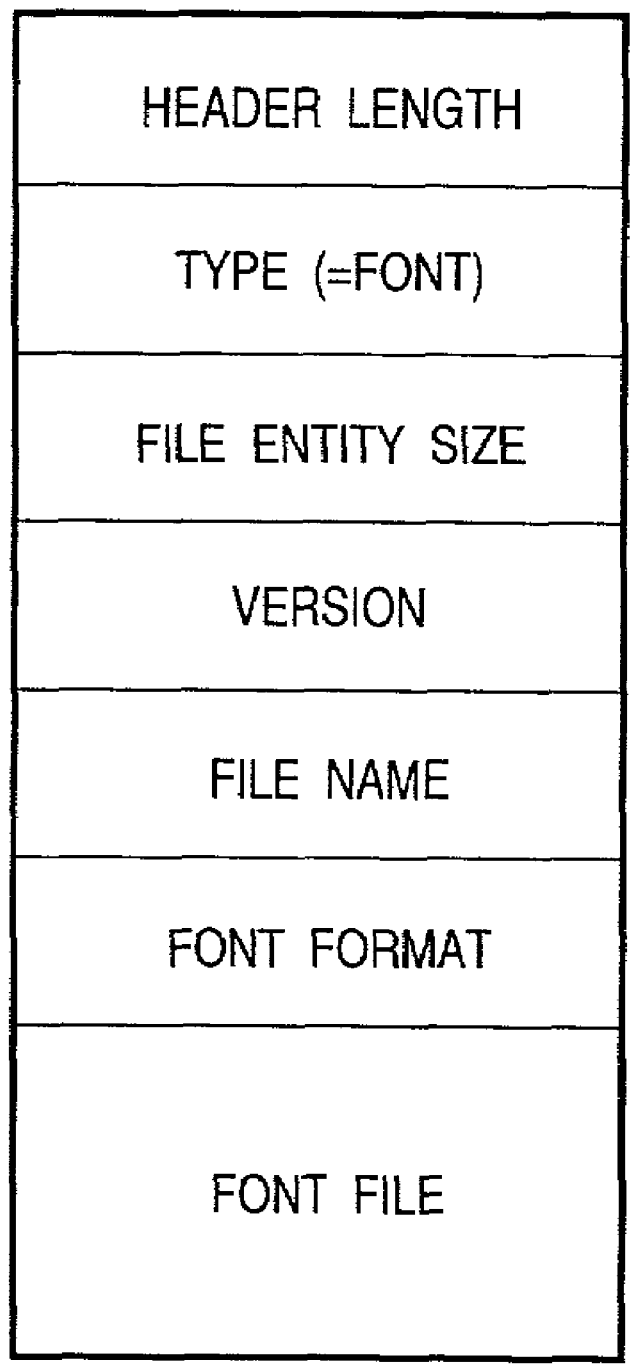
FIG. 24 is a view showing header information shown in FIG. 23 when a font file is sent to the client PC.

FIG. 24 is a view showing the header information shown in FIG. 23 when a font file is sent to the client PC 4 or 5. As shown in FIG. 24, the version, file name, and font type are added as additional information.

Figure 25:
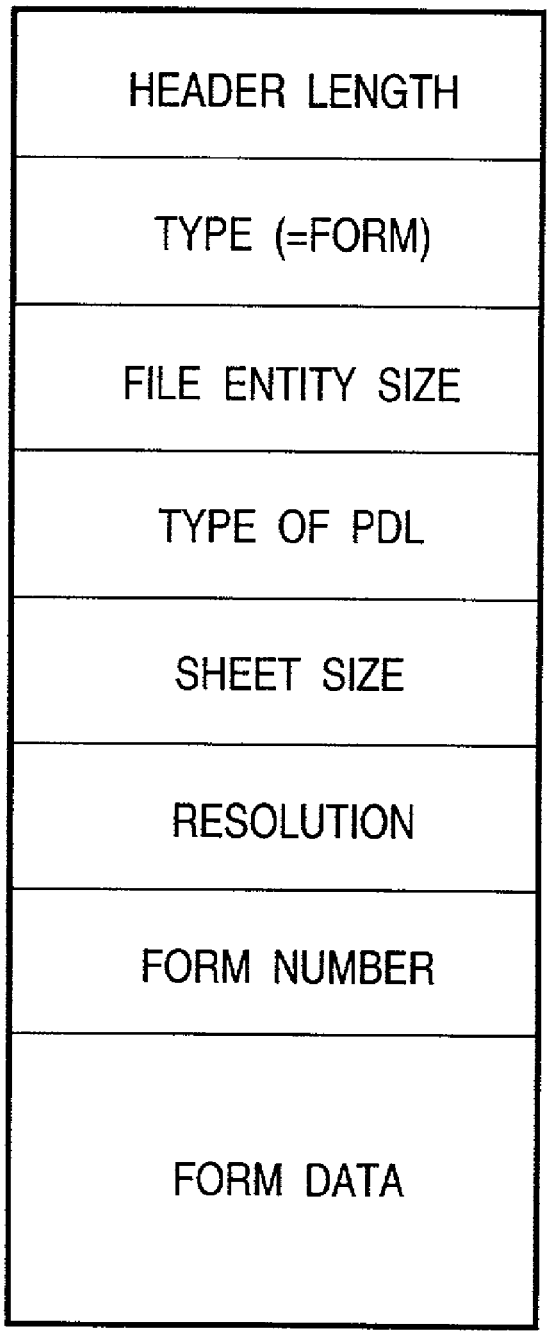
FIG. 25 is a view showing the header information shown in FIG. 23 when an overlay form is sent to the client PC.

FIG. 25 is a view showing the header information shown in FIG. 23 when an overlay form is sent to the client PC 4 or 5. As shown in FIG. 25, the type of PDL, sheet size, resolution, and form number are added as additional information.

Figure 26:
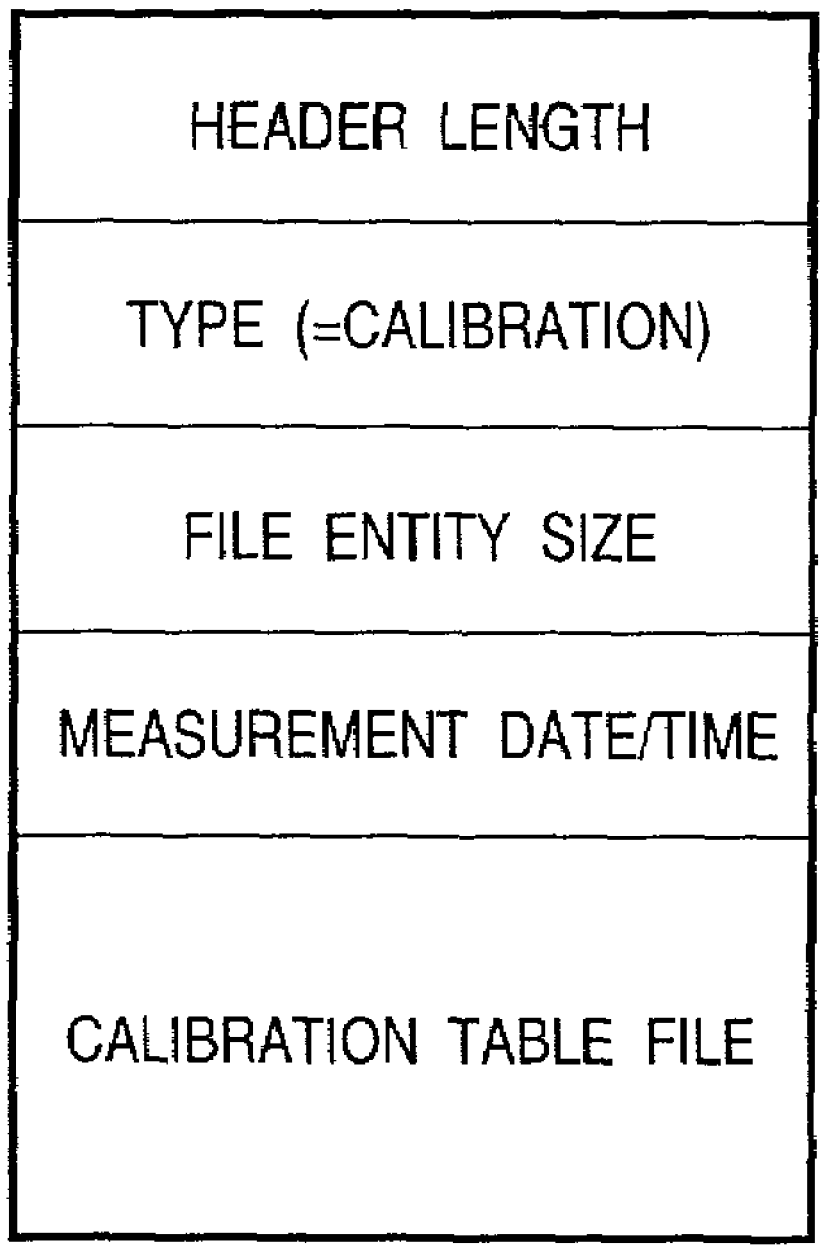
FIG. 26 is a view showing the header information shown in FIG. 23 when a color calibration table is sent to the client PC.

FIG. 26 is a view showing the header information shown in FIG. 23 when a color calibration table is sent to the client PC 4 or 5. As shown in FIG. 26, the date and time at which calibration information is measured are added as additional information.

Figure 27:
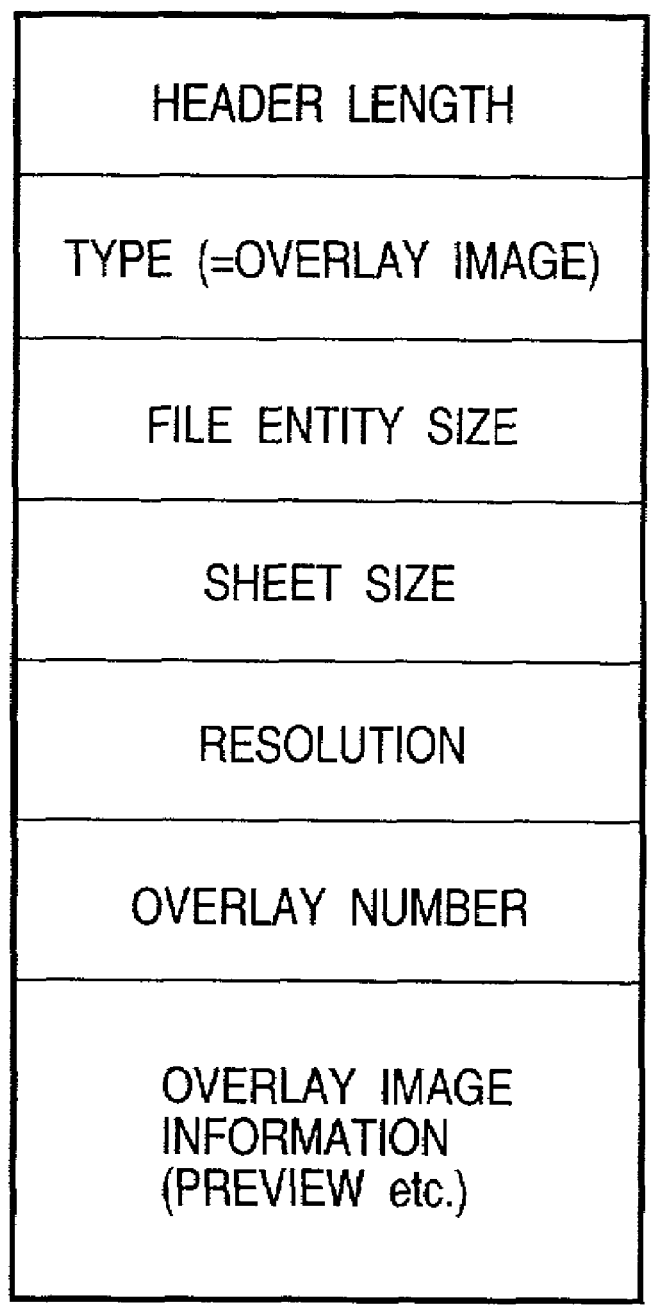
FIG. 27 is a view showing the header information shown in FIG. 23 when information used by a printer driver to overlay an image scanned by a scanner is sent to the client PC.

FIG. 27 is a view showing the header information shown in FIG. 23 when information which a printer driver uses to overlay an image scanned by a scanner is sent to the client PC 4 or 5. As shown in FIG. 27, the sheet size, resolution, and overlay number are added as additional information.

Figure 28:
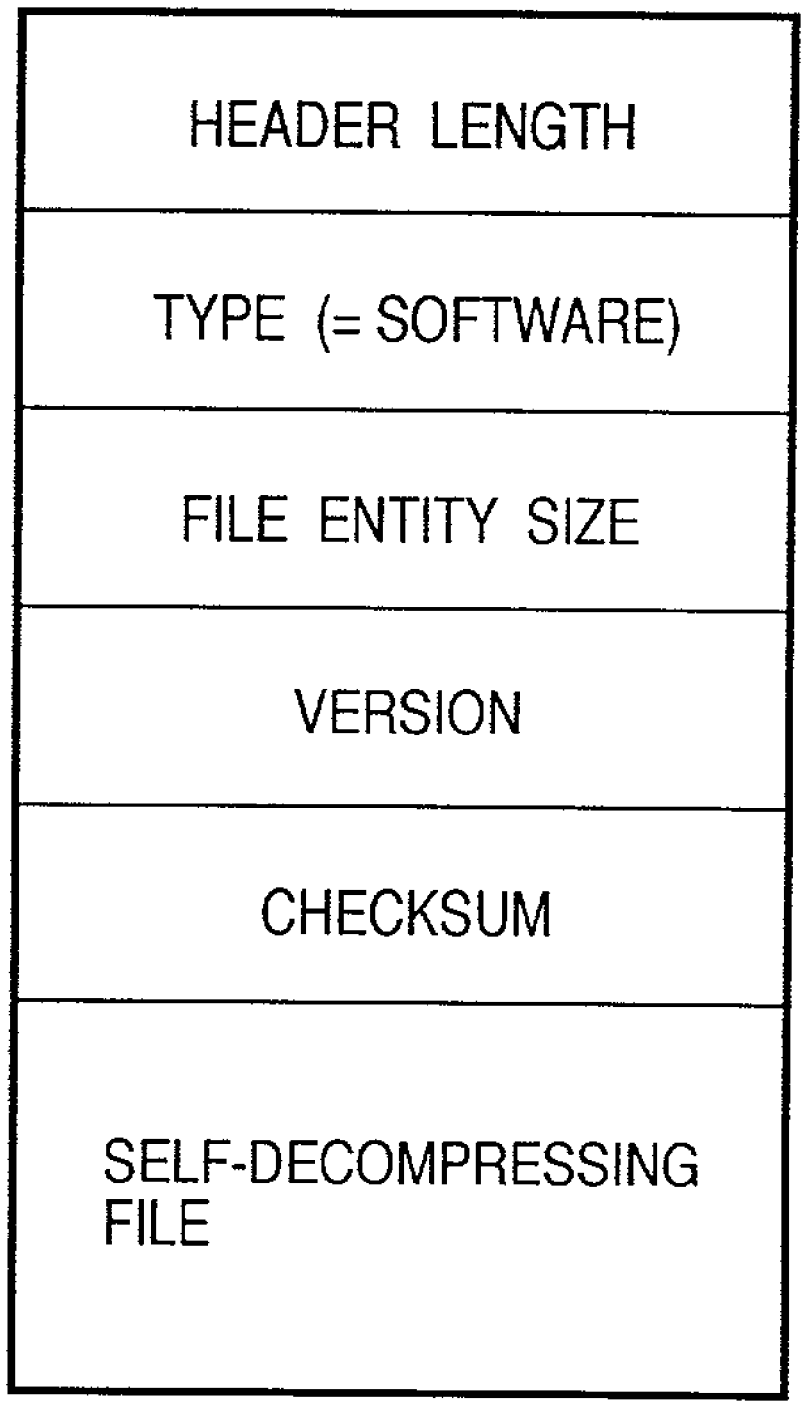
FIG. 28 is a view showing the header information shown in FIG. 23 when software is sent to the client PC.

FIG. 28 is a view showing the header information shown in FIG. 23 when software is sent to the client PC 4 or 5. As shown in FIG. 28, the version of the software and the checksum of the file are added as additional information. Also, the file entity is a self-decompressing installer. The client module 603 activates the downloaded self-decompressing installer.

Figure 29:
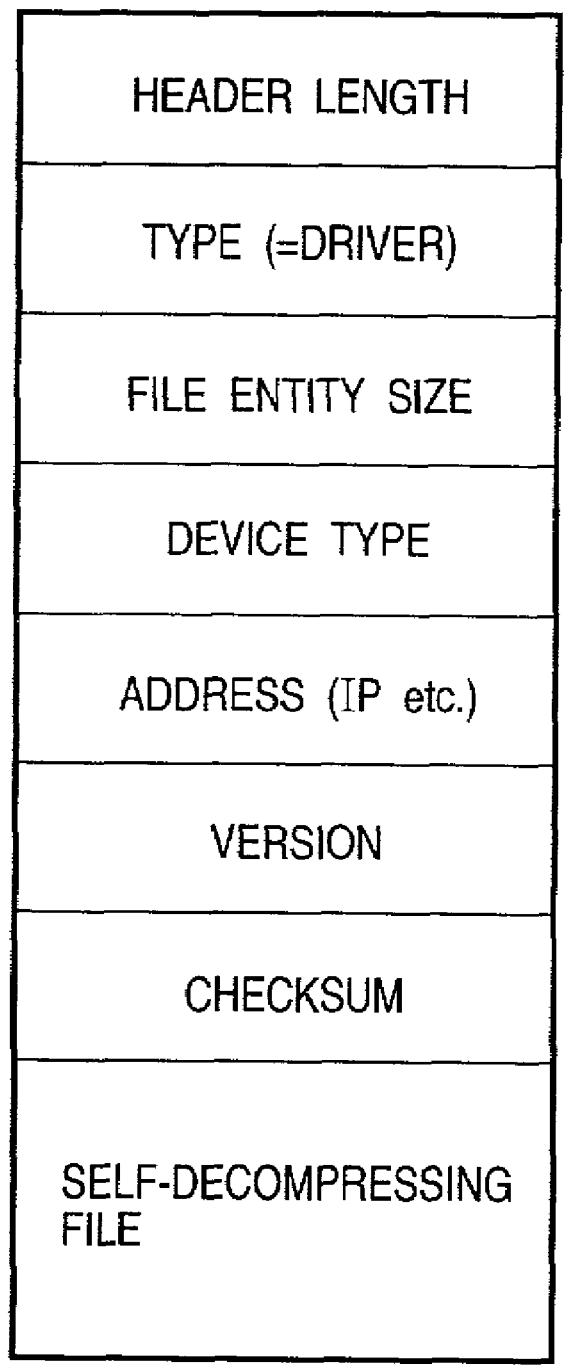
FIG. 29 is a view showing the header information shown in FIG. 23 when a driver is sent to the client PC.

FIG. 29 is a view showing the header information shown in FIG. 23 when a driver is sent to the client PC 4 or 5. As shown in FIG. 29, the device type of the peripheral device, the address (e.g., the IP address in the case of TCP/IP connection) for accessing the peripheral device, the version of the driver, and the checksum of the file are added as additional information. Also, the file entity is a self-decompressing installer. The client module 603 activates the downloaded self-decompressing installer by using the device type and the address as arguments.

In the system shown in FIG. 1, the server 2 is given the function of a file server. However, a file server can also be an independent component.

Figure 30:
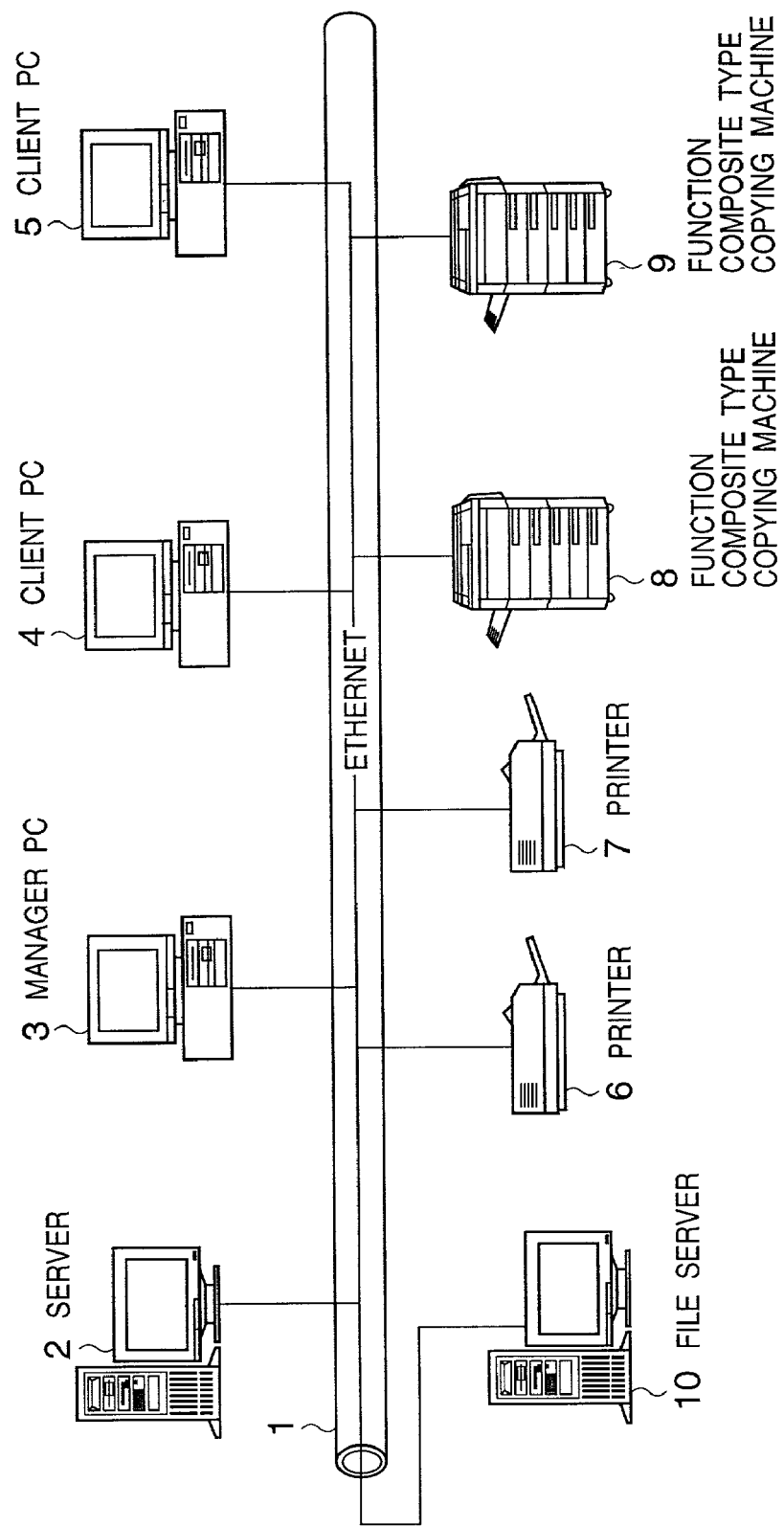
FIG. 30 is a view showing a system in which a file server is independent of other devices in the system shown in FIG. 1.

FIG. 30 is a view showing a system in which a file server is an independent component. This system shown in FIG. 30 will be described below, although the explanation is partly the repetition of that of the system shown in FIG. 1.

In FIG. 30, reference numeral 1 denotes a network, and Ethernet is used as this network 1. However, LocalTalk or the like can also be used.

A server 2 has various functions such as a Web server function.

A manager personal computer (a personal computer will be simply referred to as a PC hereinafter) 3 gives designations to the server and peripheral devices.

Client PCs 4 and 5 are PCs connected to the network 1, which are used by general users. Note that the manager PC can also be used as a client PC.

Printers 6 and 7 are connected to the network 1 to receive printing instructions from the client PCs 4 and 5 and perform printing in accordance with the instructions.

Function composite type copying machines 8 and 9 can be used as a copying machine, printer, scanner, and facsimile apparatus by using one or the combination of a plurality of functions, e.g., a copying function, image scanner function, printer function, and facsimile function.

A file server 10 usually holds files shared by the server 2 and the manager PC 3.

The operation of the system shown in FIG. 30 will be described below.

The server 2 periodically communicates with the printers 6 and 7 and the function composite type copying machines 8 and 9, and monitors the statuses of these devices and the settings of their software. The manager PC 3 changes the settings of these devices and changes their software or resources used by the software.

Pieces of designation information from the manager PC 3 are collected as internal information by the server 2 or held as files by the file server 10. The client PCs 4 and 5 receive the information from the server 2 or receive the files from the file server 10.

The server 2 has a communication function using http. The manager PC 3 and the client PCs 4 and 5 can acquire information of the server 2 by using a Web browser and can give designations to the server 2.

When receiving designation from the manager PC 3 or the client PC 4 or 5, the server 2 returns information which the server 2 has or returns a file held by the file manager 10 to the manager PC 3 or the client PC 4 or 5. Depending on the contents of the information, the server 2 acquires information from the printer 6 or 7 or the function composite type copying machine 8 or 9 and returns the information to the manager PC 3 or the client PC 4 or 5. Alternatively, the server 2 performs setting of the printers 6 and 7 and the function composite type copying machines 8 and 9.

The manager PC 3 has a downloader and can download software or resources used by the software to the printers 6 and 7 and the function composite type copying machines 8 and 9. Examples of the software are printing control firmware and network control firmware of these devices. In addition to these kinds of firmware, the function composite type copying machines 8 and 9 have, e.g., scanner control firmware, facsimile control firmware, copying machine firmware, panel operation firmware, image management software, and address management software.

Examples of the resources used by the software are fonts, EUDC, overlay forms, calibration tables, address information used by the address management software, and facsimile numbers. The file server 10 holds files of these software and resources.

The client PCs 4 and 5 hold software (e.g., drivers) for accessing and using the printers 6 and 7 and the function composite type copying machines 8 and 9, and also hold resources (client PC resources) used by the software.

Examples of the software of the client PCs 4 and 5 are a printer driver for using a printer, a scanner driver for using a scanner, a facsimile driver for using a facsimile apparatus, copying machine utility software for controlling a copying machine, a network driver for using a network, a Web browser, and application software. Examples of the resources used by the software are client PC fonts corresponding to printer fonts, address information used by the facsimile driver, printing data used when color calibration is performed, and overlay images used in preview.

In the system shown in FIG. 30, the set contents, software, and resources used by the software of the printer 6 can be reflected on the other devices, i.e., the printer 7 and the function composite type copying machines 8 and 9. Analogously, the set contents, software, and resources used by the software of the function composite type copying machine 8 can be reflected on the function composite type copying machine 9 and the printers 6 and 7.

If these device types have functional differences, only functions common to these device types are reflected. However, information of a convertible resource can be reflected after conversion. Furthermore, information concerning these device types on the client PC 4 can be reflected on the client PC 5. These processes are implemented by exchanging information via the server 2 and the file server 10.

The set contents of the printers 6 and 7 and the function composite type copying machines 8 and 9 can be changed not only by designations from the manager PC 3 but also by designations from operation panels of these devices and from the client PC 4 or 5. If change information must be accurately transferred to the client PC 4 or 5, the printers 6 and 7 and the function composite type copying machines 8 and 9 are constantly inquired when the client PC 4 or 5 gives display designation or the like, and information at the inquiry timing can be returned to the client PC. If no strict accuracy is necessary, information held in the server 2 or in the file server 10 can be used.

The file server 10 communicates with the server 2, the manager PC 3, and the client PCs 4 and 5 via the network, thereby receiving, sending, and, if necessary, managing files.

As described above, the system shown in FIG. 1 includes one server and one manager PC. However, it is possible by separating a file server to readily manage files and information even if a plurality of servers or a plurality of manager PCs are present. That is, the file server 10 holds information shared in the system and, if needed, can send information or files to each server or each manager PC and receive and manage information or files from it.

FIGS. 34, 35, 36, and 37 are views each showing the flow of data when a resource such as a font or form is downloaded to a printing device.

Figure 34:
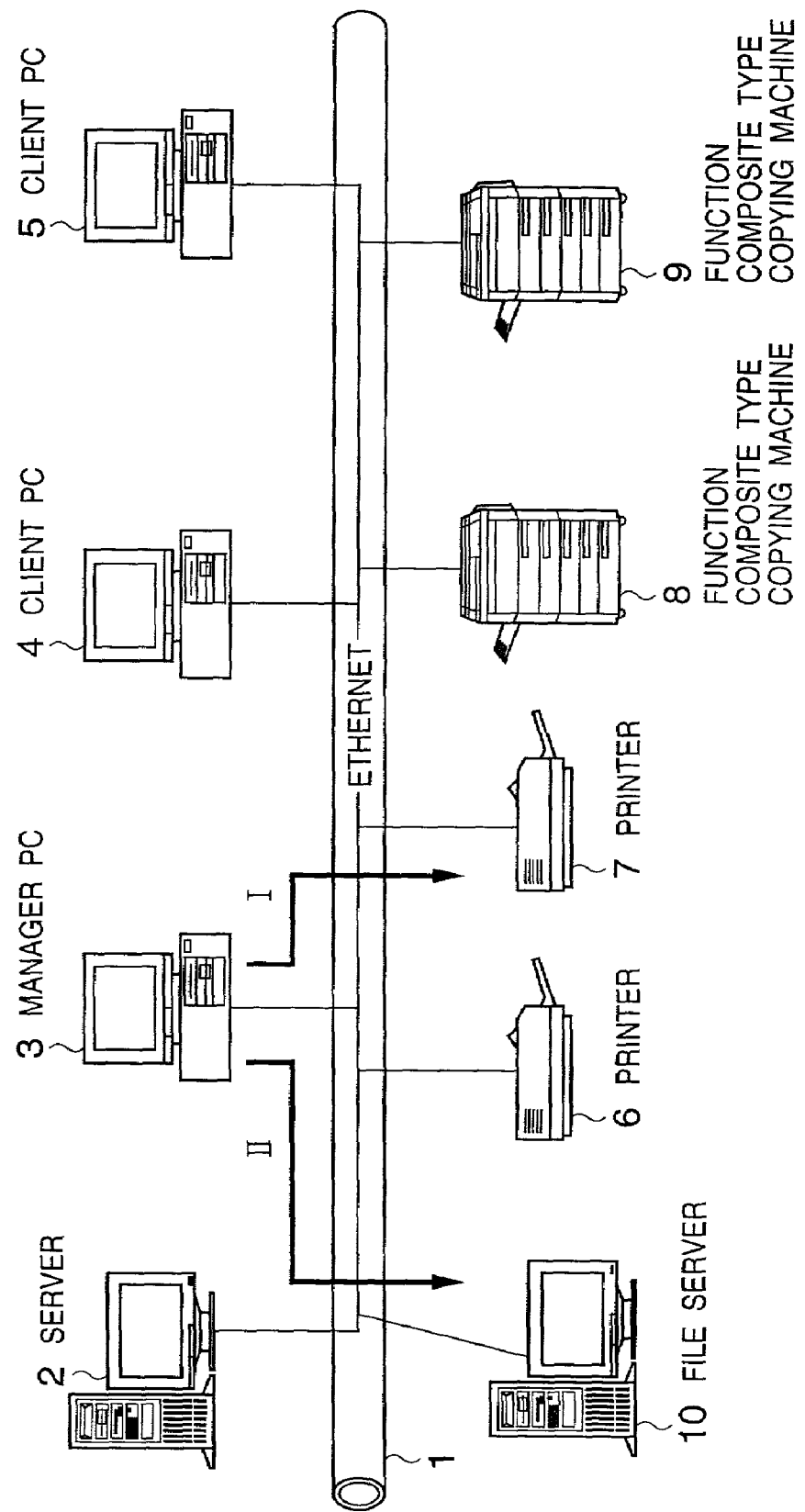
FIG. 34 is a view showing file transfer paths for download in a distributed environment.

FIG. 34 is a view showing the flow of data when the manager PC 3 directly transfers a file to the file server 10. A resource loaded from a CD-ROM or the like to the manager PC 3 by the manager is downloaded to the printer 7 (①). This resource and relevant information are registered in the file server 10 (②).

Figure 35:
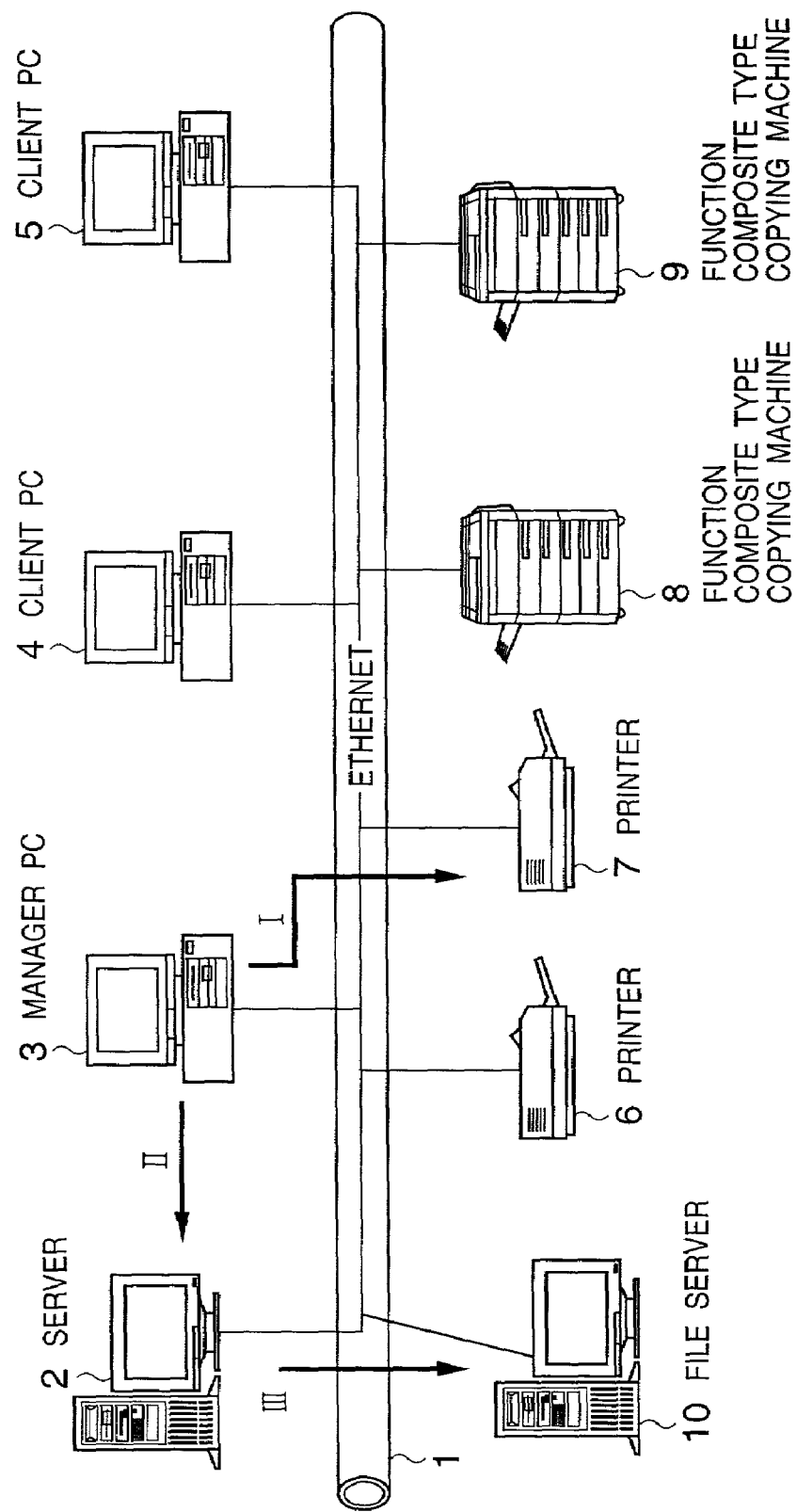
FIG. 35 is a view showing file transfer paths for download in a distributed environment.

FIG. 35 is a view showing the flow of data when the manager PC 3 transfers a file to the file server 10 via the server 2. A resource loaded from a CD to the manager PC 3 by the manager is downloaded to the printer 7 (①). This resource and relevant information are registered in the server 2 (②). Finally, the server 2 registers the data in the file server 10 (③).

Figure 36:
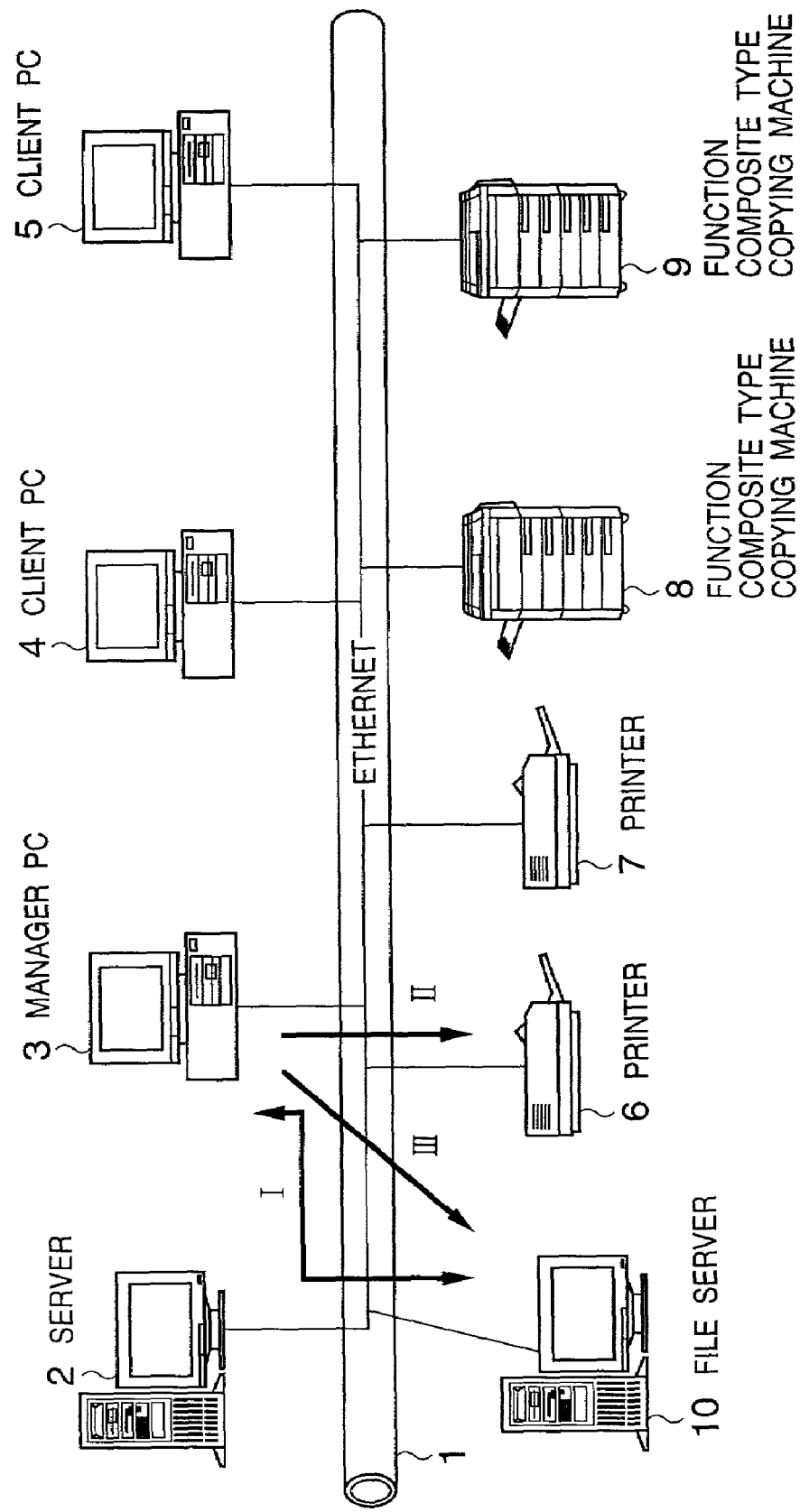
FIG. 36 is a view showing file transfer paths for download in a distributed environment.

FIG. 36 is a view showing the flow of data when the data is directly transferred from the file server 10 to the manager PC 3. The data is transferred from the file server 10 to the manager PC 3 (①). The resource is then downloaded from the PC 3 to the printer 6 (②). Relevant information is registered in the file server 10 (③).

Figure 37:
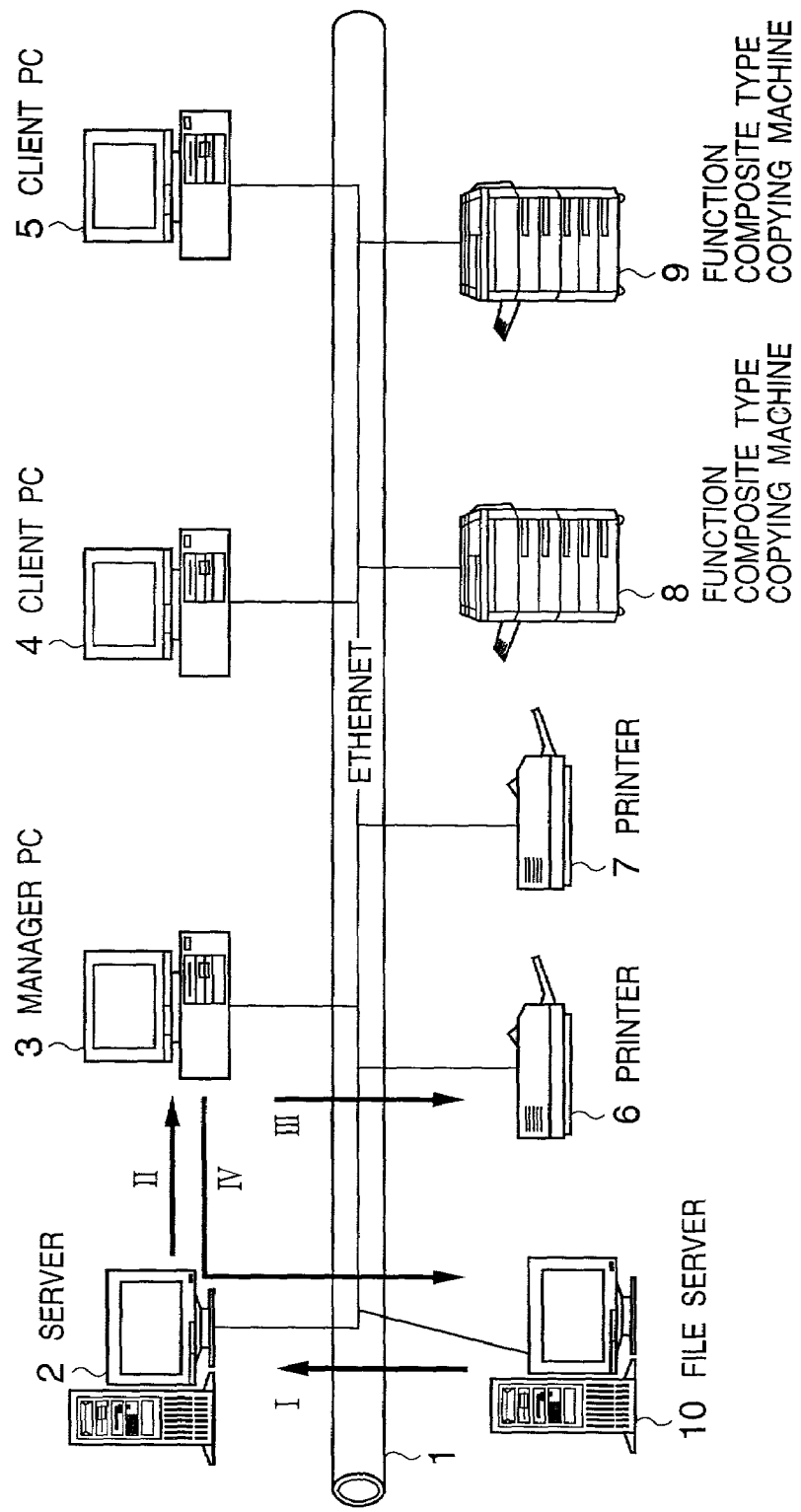
FIG. 37 is a view showing file transfer paths for download in a distributed environment.

FIG. 37 is a view showing the flow of data when the data is transferred from the file server 10 to the manager PC 3 via the server 2. A file is transferred from the file server 10 to the server 2 (①). This file is transferred from the server 2 to the-manager PC 3 (②). A font is downloaded from the manager PC 3 to the printer 6 (③). Relevant information is registered in the file server 10 via the server 2 (④)

Data to be registered upon download contains, e.g., the resource entity, information such as the network address for specifying a printing device as the download destination, the resource type such as a font or form, the file name, the file size, the date, and the registrant.

Details of the download operation are already described with reference to FIG. 8. The transfer destination and transfer source of a file in each case will be described below. In the transfer paths shown in FIGS. 34 and 36, the file server 10 is the transfer destination and transfer source of a file. In the transfer paths shown in FIGS. 35 and 37, the server 2 is the transfer destination and transfer source of a file to be transferred to the downloader. This file is transferred from the server 2 to the file server 10 or vice versa.

Figure 38:
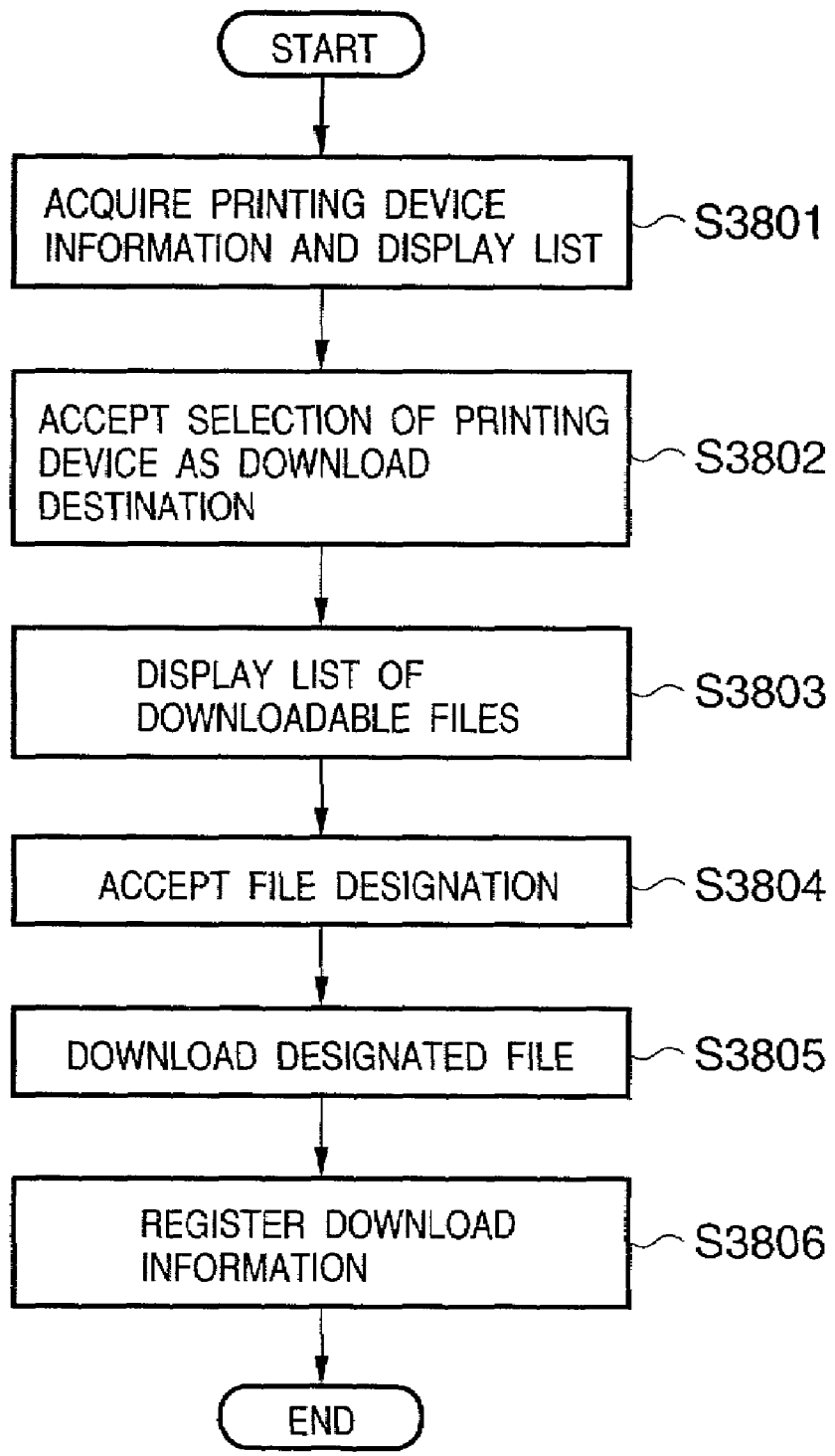
FIG. 38 is a flow chart showing a process of accepting the designation of a file on a file server 10 during download.

FIG. 38 is a flow chart showing an operation by which the downloader accepts the designations of a printing device and file.

In step S3801, information concerning a printing device is acquired from the server 2 and displayed in the form of a list. Instep S3802, the designation of a printing device is accepted. In step S3803, information concerning files downloadable to the printing device from the file server 10 via the server 2 or directly from the file server 10 is obtained from the server 2, and displayed in the form of a list.

In step S3804, the designation of a file is accepted. In step S3805, the selected file is downloaded to the selected printing device from the file server 10 via the server 2 or directly from the file server 10. In step S3806, information concerning the registered printing device and resource is registered in the file server 10 via the server 2 or directly in the file server 10.

FIG. 39 is a flow chart showing an operation of displaying a printing device and a resource status.

In step S3901, the designation of a printing device whose resource status is to be displayed is accepted. In step S3902, printing device data and resource registration status data are acquired from the file server 10. In step S3903, registered resource information concerning the printing device is displayed.

Since resources downloaded from a manager PC and resource information containing the download destinations are collectively held in the file server 10, download from a plurality of manager PCs is possible. Also, the results of download operations can be collectively displayed by a plurality of display information servers. Accordingly, it is possible to reduce the load on each manager PC, reduce the load on each display information server, and collectively and unitarily manage information.

The preferred embodiments of the present invention have been described above. However, the object of the present invention can also be achieved by supplying a storage medium storing program codes of software for implementing the functions of the above embodiments to a system or an apparatus, and reading out and executing the program codes stored in the storage medium by a computer (or a CPU or MPU) of the system or apparatus. In this case, the program codes read out from the storage medium implement the functions of the above embodiment, and the storage medium storing these program codes constitutes the present invention. Also, besides the functions of the above embodiment are implemented by executing the readout program codes by the computer, the present invention includes a case where an OS (Operating System) or the like running on the computer performs a part or the whole of actual processing in accordance with designations by the program codes and thereby implements the functions of the above embodiment.

Furthermore, the present invention includes a case where, after the program codes read from the storage medium are written in a memory of a function extension board inserted into the computer or of a function extension unit connected to the computer, a CPU or the like of the function extension board or function extension unit performs a part or the whole of actual processing in accordance with designations by the program codes and thereby implements the functions of the above embodiment.

Figure 31:
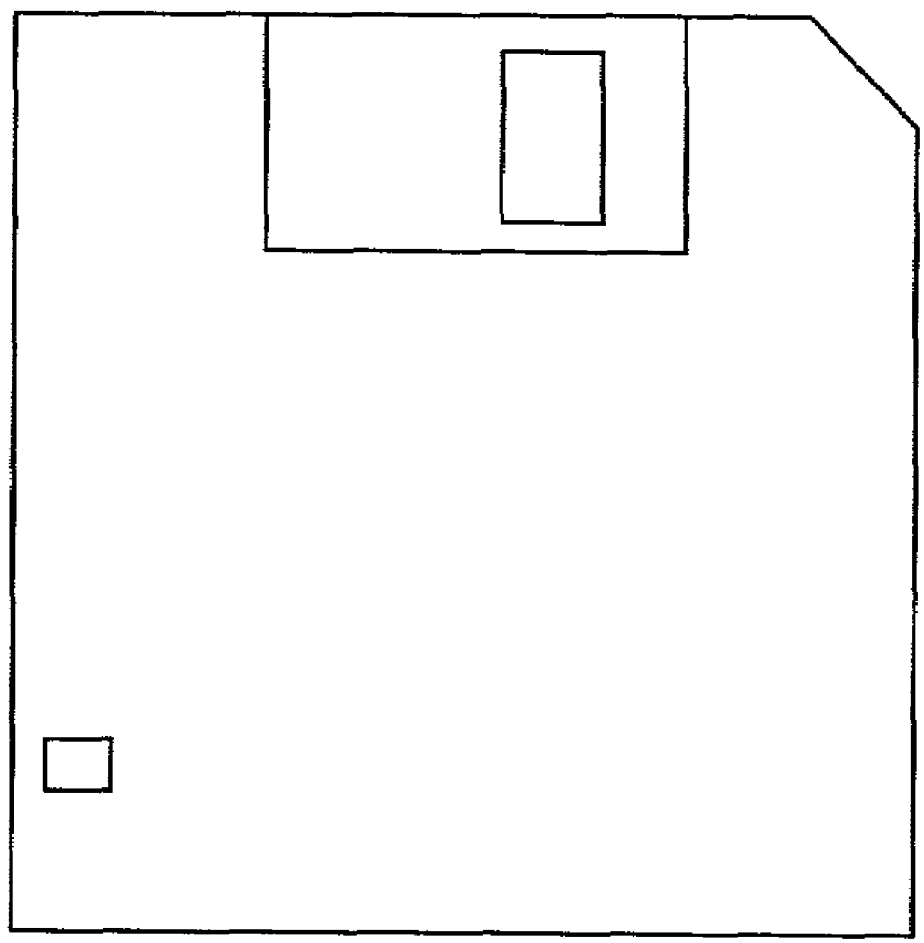
FIG. 31 is a view showing a floppy disk as an example of a storage medium for storing programs.
Figure 32:
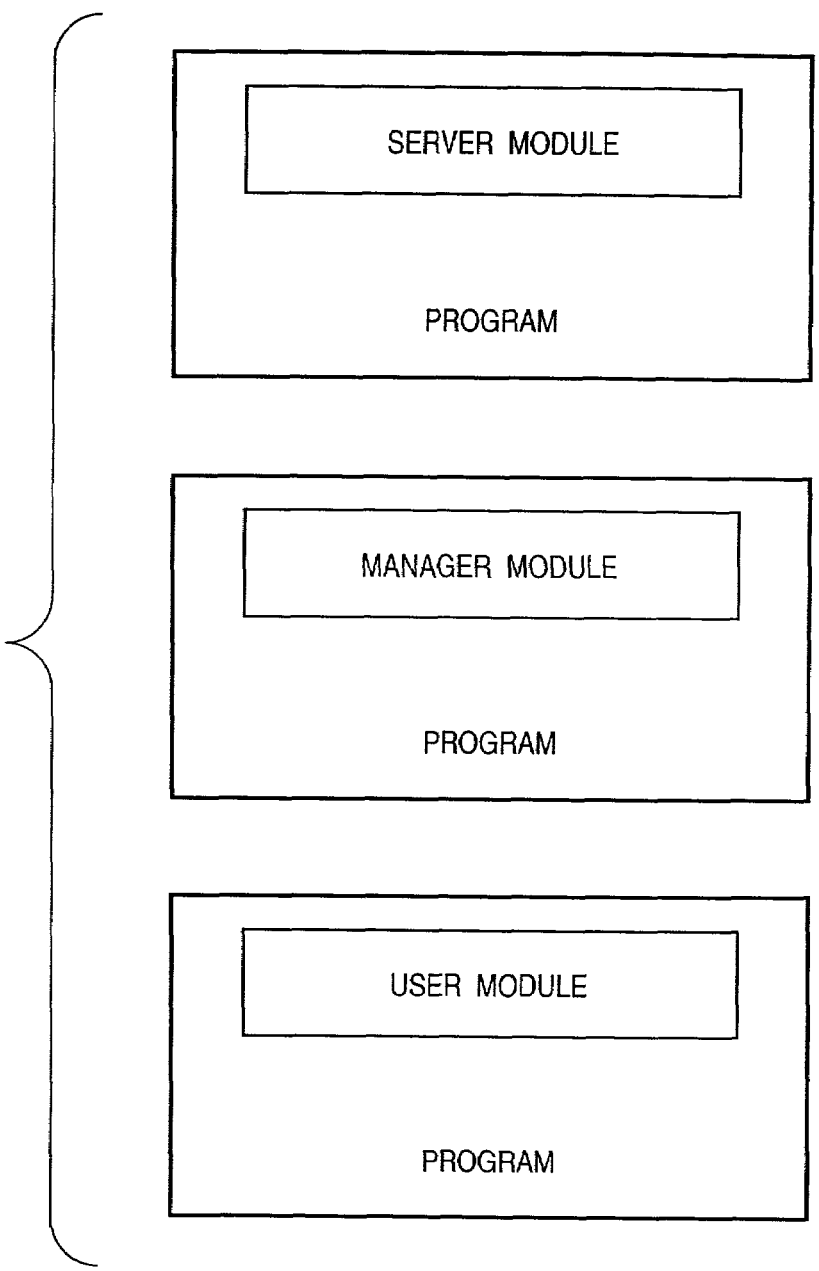
FIG. 32 is a view showing program modules to be recorded on the floppy disk.
Figure 33:
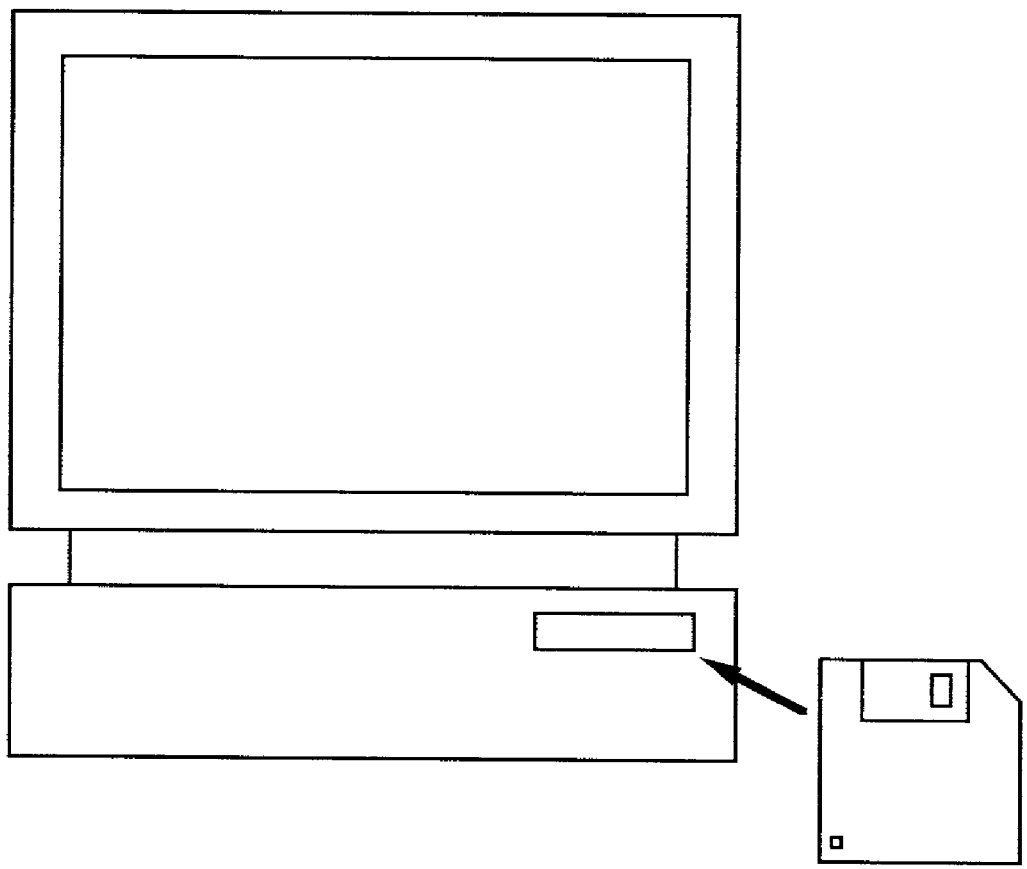
FIG. 33 is a view showing a process of loading the program modules recorded on the floppy disk into a server, manager personal computer, or user personal computer.

FIG. 31 is a view showing a floppy disk as an example of the storage medium for storing the program. FIG. 32 is a view showing program modules to be recorded on the floppy disk. FIG. 33 is a view showing a process of loading the program modules recorded in the floppy disk into a server, manager personal computer, or user personal computer. As is apparent from these drawings, the present invention can be executed by a computer such as a workstation or personal computer by using a portable storage medium.

As many apparently widely different embodiments of the present invention can be made without departing from the spirit and scope thereof, it is to be understood that the invention is not limited to the specific embodiments thereof except as defined in the appended claims.

What is claimed is:

1. A network system comprising a plurality of printing apparatuses, at least one data processing apparatus for downloading print resource data which is used during print processing to said printing apparatuses, and a server, wherein said server holds the print resource data downloaded by said data processing apparatus and information concerning the download, and said data processing apparatus comprises:

input means for inputting an identifier for identifying the print resource data to be downloaded;

first determination means for determining downloadable printing apparatuses from among said plurality of printing apparatuses in accordance with a type of a storage device attached to each of the plurality of printing apparatuses; and download means for downloading the print resource data corresponding to the input identifier to said printing apparatuses determined by said first determination means, wherein, when said data processing apparatus holds the print resource data corresponding to the input identifier, said download means downloads the print resource data held by said data processing apparatus to said printing apparatuses determined by said first determination means, when said data processing apparatus does not hold the print resource data corresponding to the input identifier, said download means acquires the print resource data from said server and downloads the acquired print resource data to said printing apparatuses determined by said first determination means, and said data processing apparatus further comprises:

reading means for reading a server flag set to the downloaded print resource data;

second determination means for determining that the downloaded print resource data should be transferred to said server when the server flag indicates that the downloaded print resource data should be transferred to said server, and determining that the downloaded print resource data should not be transferred to said server when the server flag indicates that the downloaded print resource data should not be transferred to said server, and transferring means for transferring the downloaded print resource data to said server when said second determination means determines that the print resource data should be transferred to said server.

2. The system according to claim 1, wherein said network system comprises a plurality of servers, and only a specific one of said servers holds the print resource data and the information concerning the download.

3. The system according to claim 1, wherein the print resource data contains at least one of data pertaining to software for controlling said printing apparatuses, data pertaining to a resource of the software, and data for changing settings of said printing apparatus.

4. The system according to claim 1, wherein the information concerning the download contains at least one of information for specifying said printing apparatus to which the print resource data is downloaded, the type of the print resource data, the size of the print resource data, and an operator who has performed the download operation.

5. The system according to claim 2, wherein said data processing apparatus directly transfers the print resource data and the information concerning the download to said specific server.

6. The system according to claim 2, wherein said data processing apparatus transfers the print resource data and the information concerning the download to said specific server via another one of said servers.

7. The system according to claim 2, wherein at least one of said servers comprises means for displaying the information concerning the download.

8. The system according to claim 2, wherein at least one of said servers comprises means for displaying setting information concerning settings of each of said printing apparatuses.

9. The system according to claim 1, wherein said printing apparatuses include at least one of a printer, a scanner, a copying machine, a facsimile apparatus, and a composite apparatus having some functions thereof.

10. A data processing apparatus for downloading print resource data, which is used during print processing, to a plurality of printing apparatuses, via a network system having said plurality of printing apparatuses and a server, comprising:

input means for inputting an identifier for identifying the print resource data to be downloaded;

first determination means for determining downloadable printing apparatuses from among said plurality of printing apparatuses in accordance with a type of a storage device attached to each of the plurality of printing apparatuses; and download means for downloading the print resource data corresponding to the input identifier to said printing apparatuses determined by said first determination means, wherein, when said data processing apparatus holds the print resource data corresponding to the input identifier, said download means downloads the print resource data held by said data processing apparatus to said printing apparatuses determined by said first determination means, when said data processing apparatus does not hold the print resource data corresponding to the input identifier, said download means acquires the print resource data from said server and downloads the acquired print resource data to said printing apparatuses determined by said first determination means, and said data processing apparatus further comprises:

reading means for reading a server flag set to the downloaded print resource data;

second determination means for determining that the downloaded print resource data should be transferred to said server when the server flag indicates that the downloaded print resource data should be transferred to said server, and determining that the downloaded print resource data should not be transferred to said server when the server flag indicates that the downloaded print resource data should not be transferred to said server, and transferring means for transferring the downloaded print resource data to said server when said second determination means determines that the print resource data should be transferred to said server.

11. The apparatus according to claim 10, wherein said transferring means transfers the downloaded print resource data and the information concerning the download to said server, and wherein said network system comprises a plurality of servers, and
said transferring means transfers the downloaded print resource data and the information concerning the download to a specific one of said servers.

12. The apparatus according to claim 11, wherein said transferring means transfers the downloaded print resource data and the information concerning the download to said specific server via another one of said servers.

13. A network system management method of managing download of print resource data, which is used during print processing, to a plurality of printing apparatuses in a network system in which said plurality of printing apparatuses and a server are connected, said method comprising the steps of:

inputting, to a data processing apparatus, an identifier for identifying the print resource data to be downloaded;

a first determination step of determining downloadable printing apparatuses from among said plurality of printing apparatuses in accordance with a type of a storage device attached to each of the plurality of printing apparatuses; and downloading, by the data processing apparatus, the print resource data corresponding to the input identifier to said printing apparatuses determined by said first determination step, wherein, when said data processing apparatus holds the print resource data corresponding to the input identifier, said downloading step downloads the print resource data held by said data processing apparatus to said printing apparatuses determined by said first determination step, when said data processing apparatus does not hold the print resource data corresponding to the input identifier, said downloading step acquires the print resource data from said server and downloads the acquired print resource data to said printing apparatuses determined by said first determination step, and said method further comprises:

reading a server flag set to the downloaded print resource data:

second determination step of determining that the downloaded print resource data should be transferred to said server when the server flag indicates that the downloaded print resource data should be transferred to said server, and determining that the downloaded print resource data should not be transferred to said server when the server flag indicates that the downloaded print resource data should not be transferred to said server, and transferring the downloaded print resource data to said server when said second determination step determines that the print resource data should be transferred to said server.

14. The method according to claim 13, wherein said transferring step transfers the downloaded print resource data and information concerning the download to said server, wherein said network system comprises a plurality of servers, and
said transferring step transfers the downloaded print resource data and the information concerning the download to a specific one of said servers.

15. The method according to claim 14, wherein said transferring step transfers the downloaded print resource data and the information concerning the download to said specific server via another one of said servers.

16. A computer-readable recording medium on which is stored a computer-readable program for managing download of print resource data, which is used during print processing, to a plurality of printing apparatuses in a network system having said printing apparatuses and a server, said program, when executed, causes a computer to perform the steps of:

an input step of inputting an identifier for identifying the print resource data to be downloaded;

a first determination step of determining downloadable printing apparatuses among said plurality of printing apparatuses in accordance with a type of a storage device attached to each of the plurality of printing apparatuses; and a download step of downloading the print resource data corresponding to the input identifier to said printing apparatuses determined by said first determination step, wherein, when said computer holds the print resource data corresponding to the input identifier, said download step downloads the print resource data held by said computer to said printing apparatuses determined by said first determination step, when said computer does not hold the print resource data corresponding to the input identifier, said download step acquires the print resource data from said server and downloads the acquired print resource data to said printing apparatuses determined by said first determination step, and said program causes said computer to perform:

a reading step of reading a server flag set to the downloaded print resource data;

second determination step of determining that the downloaded print resource data should be transferred to said server when the server flag indicates that the downloaded print resource data should be transferred to said server, and determining that the downloaded print resource data should not be transferred to said server when the server flag indicates that the downloaded print resource data should not be transferred to said server, and a transferring step of transferring the downloaded print resource data to said server when said second determination step determines that the print resource data should be transferred to said server.

17. The medium according to claim 16, wherein said transferring step transfers the downloaded print resource data and information concerning the download to said server, and wherein said network system comprises a plurality of servers, and
said transferring step transfers the downloaded print resource data and the information concerning the download to a specific one of said servers.

18. The medium according to claim 17, wherein said transferring step transfers the downloaded print resource data and the information concerning the download to said specific server via another one of said servers.

* * * * *